United States Patent
Nelson, Jr. et al.

(10) Patent No.: US 7,079,523 B2
(45) Date of Patent: Jul. 18, 2006

(54) MAINTENANCE LINK USING ACTIVE/STANDBY REQUEST CHANNELS

(75) Inventors: G. Rodney Nelson, Jr., Merritt Island, FL (US); John E. Hoffmann, Indialantic, FL (US); Antoine J. Rouphael, Escondido, CA (US); James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 813 days.

(21) Appl. No.: 09/775,305

(22) Filed: Feb. 1, 2001

(65) Prior Publication Data

US 2002/0080024 A1    Jun. 27, 2002

Related U.S. Application Data

(60) Provisional application No. 60/180,598, filed on Feb. 7, 2000.

(51) Int. Cl.
*H04B 7/216* (2006.01)
*G08C 17/00* (2006.01)

(52) U.S. Cl. ..................... 370/342; 370/441
(58) Field of Classification Search .............. 370/320, 370/335, 441, 479
See application file for complete search history.

(56) References Cited

U.S. PATENT DOCUMENTS

| | | | |
|---|---|---|---|
| 4,577,316 A | 3/1986 | Schiff | 370/104 |
| 4,675,863 A | 6/1987 | Paneth et al. | 370/50 |
| 4,817,089 A | 3/1989 | Paneth et al. | 370/95 |

(Continued)

FOREIGN PATENT DOCUMENTS

EP    0 773 636 A1    5/1997

(Continued)

OTHER PUBLICATIONS

Heine, Gunnar, "The Air-Interface of GSM," in *GSM Networks: Protocols, Terminology, and Implementation*, (MA: Artech House, Inc.), pp. 89-100 (1999).

(Continued)

*Primary Examiner*—Huy D. Vu
*Assistant Examiner*—Daniel Ryman
(74) *Attorney, Agent, or Firm*—Hamilton, Brook, Smith & Reynolds, P.C.

(57) ABSTRACT

Multiple field units in a CDMA system are synchronized for communication with a base station using shared forward and reverse link channels. In an illustrative embodiment, each field unit is assigned a time slot in a forward link channel to receive messages from the base station. Likewise, each field unit is assigned a time slot on a common reverse link channel for transmitting messages to the base station. Timing alignment and power level control among each of many field units and the base station is achieved by analyzing messages received at the base station in a corresponding time slot as transmitted by each field unit. Thereafter, a message is transmitted from the base station in a corresponding time slot to a particular field unit for adjusting its timing or power level so that future messages transmitted from the field unit are received in the appropriate time slot at the base station at a desired power level. In this way, minimal resources are deployed to maintain communication and precise synchronization between a base station and each of multiple users, minimizing collisions between field units transmitting in adjacent time slots on the reverse link. This method reduces the frequency a field unit must rely on the use of a slotted aloha random access channel according to IS-95.

10 Claims, 9 Drawing Sheets

U.S. PATENT DOCUMENTS

| | | | |
|---|---|---|---|
| 4,862,453 A | 8/1989 | West et al. ............... 370/82 |
| 4,866,709 A | 9/1989 | West et al. ............... 370/82 |
| 5,056,109 A | 10/1991 | Gilhousen et al. |
| 5,103,459 A | 4/1992 | Gilhousen et al. ............ 375/1 |
| 5,130,983 A | 7/1992 | Heffner, III |
| 5,257,283 A | 10/1993 | Gilhousen et al. |
| 5,267,262 A | 11/1993 | Wheatly, III |
| 5,339,316 A | 8/1994 | Diepstraten |
| 5,422,887 A | 6/1995 | Diepstraten et al. |
| 5,446,727 A | 8/1995 | Bruckert et al. ............ 370/18 |
| 5,537,397 A * | 7/1996 | Abramson ............... 370/441 |
| 5,586,119 A | 12/1996 | Scribano et al. ............ 370/350 |
| 5,604,730 A | 2/1997 | Tiedemann, Jr. |
| 5,652,764 A * | 7/1997 | Kanzaki et al. ............ 375/130 |
| 5,657,326 A | 8/1997 | Burns et al. |
| 5,657,358 A | 8/1997 | Panech et al. ............ 375/356 |
| 5,684,794 A | 11/1997 | Lopez et al. |
| 5,689,502 A | 11/1997 | Scott ............... 370/281 |
| 5,726,981 A | 3/1998 | Ylitervo et al. |
| 5,745,484 A | 4/1998 | Scott ............... 370/347 |
| 5,758,288 A | 5/1998 | Dunn et al. ............... 455/456 |
| 5,802,046 A | 9/1998 | Scott ............... 370/280 |
| 5,805,994 A | 9/1998 | Perreault et al. |
| 5,828,662 A | 10/1998 | Jalali et al. ............... 370/335 |
| 5,867,527 A | 2/1999 | Ziv et al. |
| 5,892,774 A | 4/1999 | Zehavi et al. |
| 5,893,035 A | 4/1999 | Chen |
| 5,933,781 A | 8/1999 | Willenegger et al. |
| 5,959,980 A | 9/1999 | Scott ............... 370/280 |
| 5,960,361 A | 9/1999 | Chen |
| 5,982,760 A | 11/1999 | Chen |
| 5,991,284 A | 11/1999 | Willenegger et al. |
| 6,049,538 A | 4/2000 | Scott ............... 370/347 |
| 6,058,338 A | 5/2000 | Agashe et al. ............... 701/13 |
| 6,075,974 A | 6/2000 | Saints et al. |
| 6,094,421 A | 7/2000 | Scott ............... 270/280 |
| 6,094,576 A | 7/2000 | Hakkinen et al. |
| 6,097,972 A * | 8/2000 | Saints et al. ............... 455/572 |
| 6,101,179 A | 8/2000 | Soliman |
| 6,118,767 A | 9/2000 | Shen et al. |
| 6,157,616 A | 12/2000 | Whitehead |
| 6,188,678 B1 | 2/2001 | Prescott |
| 6,188,903 B1 | 2/2001 | Gardner et al. |
| 6,201,966 B1 | 3/2001 | Rinne et al. |
| 6,208,871 B1 | 3/2001 | Hall et al. ............... 455/517 |
| 6,212,220 B1 | 4/2001 | Proctor, Jr. |
| 6,246,673 B1 | 6/2001 | Tiedemann, Jr. et al. ... 370/333 |
| 6,263,013 B1 | 7/2001 | Hendrickson ............... 375/208 |
| 6,269,075 B1 | 7/2001 | Tran ............... 370/206 |
| 6,269,088 B1 | 7/2001 | Masui et al. |
| 6,272,354 B1 | 8/2001 | Saaroi |
| 6,275,478 B1 | 8/2001 | Tiedemann, Jr. |
| 6,301,291 B1 | 10/2001 | Rouphael et al. |
| 6,353,645 B1 | 3/2002 | Solve et al. |
| 6,396,823 B1 | 5/2002 | Park et al. |
| 6,452,913 B1 | 9/2002 | Proctor, Jr. |
| 6,466,800 B1 | 10/2002 | Sydon et al. |
| 6,483,816 B1 * | 11/2002 | Tsunehara et al. ............ 370/318 |
| 6,512,751 B1 | 1/2003 | Struhsaker et al. |
| 6,522,639 B1 * | 2/2003 | Kitade et al. ............... 370/335 |
| 6,532,226 B1 | 3/2003 | Lehtinen et al. |
| 6,545,994 B1 | 4/2003 | Nelson, Jr. et al. |
| 6,567,391 B1 * | 5/2003 | Moon ............... 370/342 |
| 6,570,865 B1 * | 5/2003 | Masui et al. ............... 370/342 |
| 6,574,211 B1 | 6/2003 | Padovani et al. |
| 6,647,000 B1 | 11/2003 | Persson et al. |
| 6,717,916 B1 | 4/2004 | Ahn et al. |
| 6,724,740 B1 | 4/2004 | Choi et al. |
| 6,735,188 B1 | 5/2004 | Becker et al. |
| 6,804,219 B1 * | 10/2004 | Koo et al. ............... 370/335 |
| 2001/0030990 A1 | 10/2001 | Rouphael et al. |
| 2001/0033558 A1 | 10/2001 | Matsuki |
| 2001/0036200 A1 | 11/2001 | Neslon et al. |
| 2002/0080024 A1 | 6/2002 | Nelson et al. |
| 2004/0047328 A1 | 3/2004 | Proctor et al. |

FOREIGN PATENT DOCUMENTS

| | | |
|---|---|---|
| EP | 0 910 176 A2 | 4/1999 |
| EP | 1 018 809 A2 | 12/2000 |
| GB | 2326564 A | 12/1998 |
| WO | WO 97/46041 A2 | 4/1997 |
| WO | WO 99/4869 A2 | 3/1999 |
| WO | WO 99/31811 | 6/1999 |
| WO | WO 99/52306 | 10/1999 |
| WO | WO 99/63682 | 12/1999 |

OTHER PUBLICATIONS

Ovesjö Fredrik, European Telecommunication Standard, SMG2 UMTS Physical Layer Expert Group, " *UTRA Physical Layer Description FDD parts*" (v0.4, Jun. 25, 1998), pp. 1-41, XP-002141421.

Yang, Samuel C., "Principles of Code Division Multiple Access," In *CDMA RF System Engineering*,(MA: Artech House, Inc.) Ch. 4, pp. 75-103 (1998).

* cited by examiner

| subscriber mode | synchronization channels | timing reference in reverse link | assignment of traffic channels for data transmissions |
|---|---|---|---|
| Active | LQM + traffic | Pilot symbol sequence in traffic channel | Yes |
| Standby | LQM + heartbeat OR LQM + heartbeat-request | unique code of heartbeat standby channel OR unique code of heartbeat request active ch. | No |
| idle | none | none | No |

Fig. 8

MAINTENANCE LINK USING ACTIVE/STANDBY REQUEST CHANNELS

RELATED APPLICATION

This application claims the benefit of U.S. Provisional Application Ser. No. 60/180,598 filed on Feb. 7, 2000, the entire teachings of which is incorporated herein by this reference.

BACKGROUND OF THE INVENTION

Increasing use of wireless telephones and personal computers has led to a corresponding increase in demand for advanced telecommunication services that were once thought practical only for specialized applications. In the 1980s, wireless voice communication became widely available through cellular telephone networks. Such services were thought at first to be for the exclusive province of businessmen because of expected high subscriber costs. The same was also true for access to remotely distributed computer networks, whereby until very recently, only business people and large institutions could afford the necessary computers and wireline access equipment.

As a result of the widespread availability of affordable new technologies, the general population now increasingly desires to have not only wireline access to networks such as the Internet and private intranets, but also wireless access as well. Wireless technology is particularly useful to users of portable computers, laptop computers, hand-held personal digital assistants and the like who prefer access to such networks without being tethered to a telephone line.

There still is no widely available satisfactory solution for providing low cost, high speed access to the Internet, private intranets, and other networks using the existing wireless infrastructure. This is most likely an artifact of several unfortunate circumstances. First, the typical manner of providing high speed data service in the business environment over a wireline network is not readily adaptable to the voice grade service available in most homes or offices. For example, such standard high speed data services do not necessarily lend themselves to efficient transmission over standard cellular wireless handsets because wireless networks were originally designed only to provide voice services. As a result, present day digital wireless communication systems are optimized for voice transmissions, although certain schemes such as CDMA do provide some measure of asymmetrical behavior for the accommodation of data transmissions. For example, the data rate specified by the Telecommunication Industry Association (TIA) for IS-95 on the forward traffic channel is adjustable in increments from 1.2 kbps up to 9.6 kbps for so-called Rate Set 1, and increments from 1.8 kbps up to 14.4 kbps for Rate Set 2. On the reverse link traffic channel, however, the data rate is fixed at 4.8 kbps.

At best, existing wireless systems therefore typically provide a radio channel that can accommodate maximum data rate transfers of 14.4 kilobits per second (kbps) over a forward link direction. Such a low data rate channel does not lend itself directly to transmitting data at rates of 28.8 or even 56.6 kbps that are now commonly available using inexpensive wireline modems, not to mention even higher rates such as the 128 kbps that are available with Integrated Services Digital Network (ISDN) type equipment. Data rates at these levels are rapidly becoming the minimum acceptable rates for activities such as browsing web pages.

Although wireline networks were known at the time when cellular systems were initially developed, for the most part, there was no provision made for such wireless systems to provide higher speed ISDN- or xDSL-grade data services over cellular network topologies.

In most wireless systems, there are many more potential users than radio channel resources. Some type of demand-based multiple access system is therefore required.

Whether the multiple access is provided by the traditional Frequency Division Multiple Access (FDMA) using analog modulation on a group of radio frequency carrier signals, or by schemes that permit sharing of a radio carrier frequency using Time Division Multiple Access (TDMA), or Code Division Multiple Access (CDMA), the nature of the radio spectrum is such that it is expected to be shared. This is quite dissimilar to the traditional environment supporting data transmissions in which the wireline medium is relatively inexpensive and is not typically intended to be shared.

Other factors to consider in the design of a wireless system are the characteristics of the data itself. For example, consider that access to web pages generally is burst-oriented, with asymmetrical data rate transmission requirements in a reverse and forward direction. In a common application, a user of a remote client computer first specifies the address of a web page to a browser program. The browser program then sends the web page address data, which is usually 100 bytes or less in length, over the network to a server computer. The server computer then responds with the content of the requested web page, which may include anywhere from 10 kilobytes to several megabytes of text, image, audio, or even video data. The user thereafter may spend several seconds or even several minutes reading the content of the page before downloading another web page.

In an office environment, the nature of most employees' computer work habits is typically to check a few web pages and then to do something else for an extended period of time, such as accessing locally stored data or even terminating use of the computer altogether. Therefore, even though such users may remain connected to the Internet or private intranet continuously during an entire day, actual use of the high speed data link is usually quite sporadic.

If wireless data transfer services supporting Internet connectivity are to coexist with wireless voice communication, it is becoming increasingly important to optimize the use of available resources in wireless CDMA systems. Frequency re-use and dynamic traffic channel allocation address some aspects of increasing the efficiency of high performance wireless CDMA communication systems, but there is still a need for more efficient utilization of available resources.

SUMMARY OF THE INVENTION

The present invention provides several novel features for optimizing wireless links in a CDMA communication system. In an illustrative embodiment, a pair of shared channels is allocated for transmitting a message at a specified time from a field unit to a base station for synchronizing the base station to the field unit. More specifically, a message received at the base station from the field unit on either one of the pair of shared channels is analyzed to determine whether the field unit is properly synchronized with the base station to transmit properly within an assigned time segment. Minimal timing feedback messages to advance or retard timing are then transmitted in a forward link to the field unit so that subsequent messages by the field unit are transmitted within the appropriate time segment. Preferably, synchronization of links is maintained between a base station and each of multiple field units simultaneously. Thus according to one aspect of the shared communication system of the present invention, minimal resources are allocated for maintaining synchronization links with multiple field units so that wireless resources can be reserved for high bandwidth data transfers.

In a preferred embodiment, a forward link channel is allocated to support time-slotted message transmissions from a base station to each of multiple field units. In an opposite direction, reverse link channels are allocated to support time-slotted message transmissions from the field units back to the base station. Thus, each channel is partitioned into time slots or time segments, where a time slot in the forward channel is assigned to a field unit for directing communications from the base station to the corresponding field unit. Likewise, a time slot in a reverse channel is assigned to a field unit for transmitting messages to the base station. For both forward and reverse link communications, the relative position of a time slot itself indicates to which field unit a message is directed from the base station or from which field unit a message is transmitted to the base station.

In one application, a forward link channel is partitioned to include both "active" and "standby" time slots, where an active time slot is assigned to a field unit to indicate that reverse link traffic channels are presently being used for transmitting a data payload to the base station in the reverse link. A standby time slot is assigned to a field unit for maintaining synchronization with the base station even though the corresponding field unit is not presently transmitting a data payload over the reverse link. Consequently, a field unit in the standby mode can immediately transmit on newly assigned reverse link channel without a prolonged delay of re-synchronizing since the field unit is already synchronized with the base station.

The base station monitors the field units, acknowledging requests by corresponding field units to be placed in the active mode. If available, an active time slot is assigned to the link requesting field unit and traffic channels are allocated in the reverse link to support a data payload transfer between the requesting field unit and the base station. Following a data transfer on a particular link, the field unit is reassigned to a standby time slot for maintaining a minimal but synchronized link with the base station.

In a preferred embodiment, there are a predetermined number of periodically repeating time slots allocated within each of the forward link and a pair of reverse link coded channels. Hence, messages from the base station or field units can be transmitted on a periodic basis in the appropriate time slots of the shared channels. Preferably, the time slot assigned to a field unit in the first channel for receiving data from the base station is offset in time with respect to the corresponding time slot assigned in the pair of channels for transmitting a timing indication marker from the field unit to the base station. This allows the base station time to analyze a timing of a received message in a time slot, generate a timing adjustment feedback message and transmit it to the corresponding field unit in the appropriate time slot of the forward channel.

To maintain synchronization, messages received at the base station in assigned time slots from each of many field units are analyzed to determine how to adjust the timing of future message transmissions at the corresponding field units. In particular, message transmissions from a field unit are adjusted so that a message is received at the base station in an assigned time slot or time segment. This is achieved by transmitting a timing adjustment message from the base station over the forward link to the field unit, where the timing adjustment message indicates whether the field unit should advance or retard timing of future message transmissions so that they fall within a desired time slot. In this way, field units transmitting messages in adjacent time slots of the same reverse link channel typically will not interfere with each other. This reduces co-channel interference.

Messages transmitted over a reverse link channel from a field unit to the base station preferably include markers for synchronizing the corresponding field unit with the base station. The markers transmitted within a message provide a precise reference point within a time slot itself for generating timing correction information as described above. For example, the base station analyzes a marker within a time slot and determines a degree to which the field unit must adjust its timing in the reverse link during that subsequent messages are transmitted by the field in the appropriate time segment. Preferably, a well-placed string of pilot symbols is used as a time reference marker in a time slot. Alternatively, a short pseudo random noise (PN) code may be used as a marker in a time slot. Of course, any type of marker can be used as long as it is detectable by the base station.

While in the active mode, a marker in a corresponding time slot of the traffic channels is analyzed to support timing alignment between the field unit and base station. While in the inactive or standby mode, a marker in a time slot of either one of the pair allocated reverse link channels is analyzed to support timing alignment between the field unit and base station.

As previously discussed, the shared forward link channel is used to transmit link quality messages or timing adjustment messages from a base station to multiple field units. In an opposite direction, the reverse link includes a pair of uniquely coded first and second channels. Each channel of the pair serves a particular purpose. For example, a time segment or time slot of the reverse link channels is assigned to a field unit for transmitting an indication message to the base station. A data transmission from a field unit over the first channel indicates a first type of message to the base station while a data transmission from the field unit over the second channel indicates a second type of message to the base station. Accordingly, the mere transmission on a particular channel itself provides an indication or message to the base station. Consequently, an encoded data payload need not be transmitted to communicate with the base station.

In one application, a transmission of a marker in a time slot over one channel indicates a request by the corresponding field unit to go active. That is, transmission of a marker in an assigned time slot indicates that the field unit is requesting that reverse link traffic channels be assigned to the user for transmitting a data payload from the field unit to the base station. This presumes that the field unit is presently in the standby mode. Alternatively, a field unit transmits a marker over a second channel of the pair of reverse link channels to indicate that the field unit is not requesting to be placed in the active mode. For example, the field unit does not want to transmit data on a reverse link channel. Rather, the field unit requests to remain inactive but synchronized with the base station so that the field unit can immediately go active again at any moment.

As previously discussed, synchronization is achieved by monitoring markers received at the base station for each of multiple field units and transmitting an adjustment message in reverse link so that future transmissions are properly aligned within a time slot. In a preferred application, a field unit transmits a marker in at least one of three reverse link channels so that the base station and field units can be synchronized. For example, precise timing alignment is achieved while a field unit is in the standby mode via a marker transmitted in a time slot of the first shared reverse link channel. When a field unit desires to go active, the field unit then discontinues transmitting the marker in first shared channel and transmits a marker in the same time segment over the second channel. This transmission over the second channel serves two purposes. The first purpose is to indicate that the field unit desires to be placed in the active mode. The second purpose is to transmit a marker from the field unit so that the base station can continue to analyze whether a field unit is properly synchronized. In an instance where reverse link traffic channels are assigned for use by a particular field unit, the field unit discontinues transmitting a marker in either the first or second channel to maintain synchronization. Rather, the field unit then transmits a marker in the assigned reverse link traffic channels. Similar to the method as previously discussed, the base station will now monitor a portion of a marker transmitted in the reverse link traffic channel to determine whether the field unit is properly synchronized to transmit within a time slot. In this way, feedback to each of the field units ensures that they are precisely aligned for transmitting data within an assigned time slot no matter the mode of the field unit. In other words, precise timing alignment for a particular link to a field unit is optimally maintained whether the field unit is in the standby mode, request-to-go active mode, or presently transmitting a data payload on one or multiple assigned reverse link traffic channels.

In a preferred embodiment, the message sent from the base station to a field unit for adjusting its timing with respect to the base station includes a single bit indicating whether to advance or retard the slot timing reference at the field unit. Based on the state of the bit as received in a time slot at a corresponding field unit, the field unit then advances or retards its slot timing a predefined amount of time such as ⅛ of a chip. If a state of the single bit as received in successive feedback messages at the field unit is in a same state n times in a row, i.e., n logic ones or zeros are received in a row, a subsequent bit in the same state will cause the field unit to advance or retard its timing based on a larger predefined time such as ½ of a chip rather than ⅛ of a chip. Consequently, a field unit that is grossly out of synchronization with the base station will be synchronized more quickly than if a smaller fixed adjustment time such as ⅛ of a chip were used to continuously adjust timing.

To synchronize newly powered field units, the base station monitors an access channel for requests by such field units to establish new links with the base station. The time a random or pseudo-random link request message is received over the access channel at the base station can be used to generate an initial timing adjustment to be made at the requesting field unit for achieving timing synchronization with the base station.

More particularly, to achieve initial synchronization of time slots between the base station and field unit, a coarse timing adjustment message is transmitted to a respective field unit indicating how to initially achieve a gross timing alignment with the base station. The coarse timing adjustment message is preferably a multi-bit value notifying the field unit of an amount to advance or retard its initial timing to achieve synchronization with the base station. Accordingly, a field unit can be coarsely or precisely synchronized for receiving and transmitting messages in an assigned time slot.

Preferably, the coarse timing adjustment message is sent to the link requesting field unit over a paging channel. Likewise, dynamic time slot assignment information is transmitted to a field unit over the paging channel.

In another illustrative embodiment of the present invention, a coded channel of the wireless communication system is allocated to support synchronized communications from each of multiple transmitters and a receiver. A first portion of the coded channel is assigned for use by a first transmitter to transmit a reference signal to the receiver, while a second portion of the channel is assigned for use by a second transmitter to transmit a message to the receiver. Preferably, the coded channel is divided into time slots and each transmitter transmits in the appropriate time slot to the receiver.

According to this method, multiple transmitters can transmit different types of information to the receiver over the coded channel. For example, the reference signal transmitted by the first transmitter is optionally a timing signal analyzed by the receiver. Timing adjustment messages in a feedback link can then be communicated to the first transmitter to adjust its timing. At the same time, a message is transmitted by the second transmitter to the receiver over the coded channel.

Preferably, the reference signal generated by the first transmitter does not include forward error correction information, while the message transmitted by the second transmitter does include forward error correction information. In a specific application, the message transmitted from the second transmitter to the receiver is a feedback message including a link quality message indicating a reverse link quality of transmissions between the receiver and corresponding transmitter.

In another illustrative embodiment of the present invention, a first and second coded channels are allocated to support synchronized communications from a transmitter to a receiver. Preferably, the first and second coded channels are divided into time slots in which a transmitter communicates an indication to a target receiver by generating a signal at an adjusted power level from the transmitter to the receiver. As previously discussed, the transmission over the first or second coded channel itself indicates a message to the receiver. For example, transmission within a time slot of the first coded channel indicates to the receiver that the field unit desires to remain in a standby mode, while a transmission over the second coded channel indicates to the receiver that the transmitter would like to transmit a data payload to the receiver over additionally assigned traffic channels.

The indication transmitted over the first or second channel in a time slot is analyzed at the receiver to determine the strength of the received signal. If the signal strength is lower than a desired level, a feedback message generated by the receiver is communicated to the transmitter for adjusting its power level for subsequent transmissions on the first or second coded channel. In this way, the power level of a transmitter can be adjusted to reduce co-channel interference in a wireless system. More specifically, the power level of a transmitting device can be gradually increased or decreased so that it has minimal impact on other channels.

A power adjustment message communicated from the receiver to the transmitter can include a single bit indicating whether the transmitter should increase or decrease its power output for subsequent transmissions. Thus, power can be optimally adjusted even in a dynamic environment where the signal to noise ratio can change almost instantaneously.

This method of adjusting power is similar to the method as previously described for synchronizing a transmitter to a receiver via feedback messages. However, in this illustrative embodiment, the power level output of the transmitter is adjusted via feedback messages instead of timing. Thus, the power level of a transmitter can be adjusted while in a standby mode so that, in the event that the transmitter goes active transmitting a data payload to the receiver, the power level of the transmitter is optimized to reduce co-channel interference. Both power and timing feedback loops can be implemented simultaneously so that the power output level and timing of a transmitter is optimized for potentially sporadic data transmissions.

One aspect of the present invention is to provide a link between a base station and each of multiple field units using minimal resources. Providing shared channels using the methods as described above for communicating with a base station reduces the number of CDMA channels necessary to maintain synchronized links with multiple field units. Accordingly, more channels or resources are then available to support data transfers between the base station and field units. This increases the potential throughput on an allocated carrier frequency.

Another aspect of the present invention involves a novel method of providing a minimal feedback loop for supporting timing alignment between the base station and each of multiple field units. The base station analyzes a marker incorporated in each message received in an assigned time slot to detect whether a field unit message directed to the base station is early or late with respect to a preferred timing with respect to the base station. A message such as a single advance/retard control bit is then transmitted back to the corresponding field unit to advance or retard its timing so that future message transmissions from the field unit are received at the base station in the appropriate time slot. Thus, multiple field units transmitting messages on the shared reverse link channel generally do not interfere with each other when transmitting in adjacent time slots. Additionally, the timing information sent on the forward link enables the field unit to synchronize itself to the base station for receiving messages in its assigned time slot on the forward link. As a consequence of maintaining each of multiple synchronized links, a corresponding field unit can immediately transmit a data payload in a reverse link direction without having to go through a lengthy process of re-synchronizing with the base station prior to a data transmission.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 is a table showing attributes of an active, standby and idle mode for synchronizing a field unit to a base station according to the principles of the present invention.

DETAILED DESCRIPTION OF A PREFERRED EMBODIMENT

Figure 1:
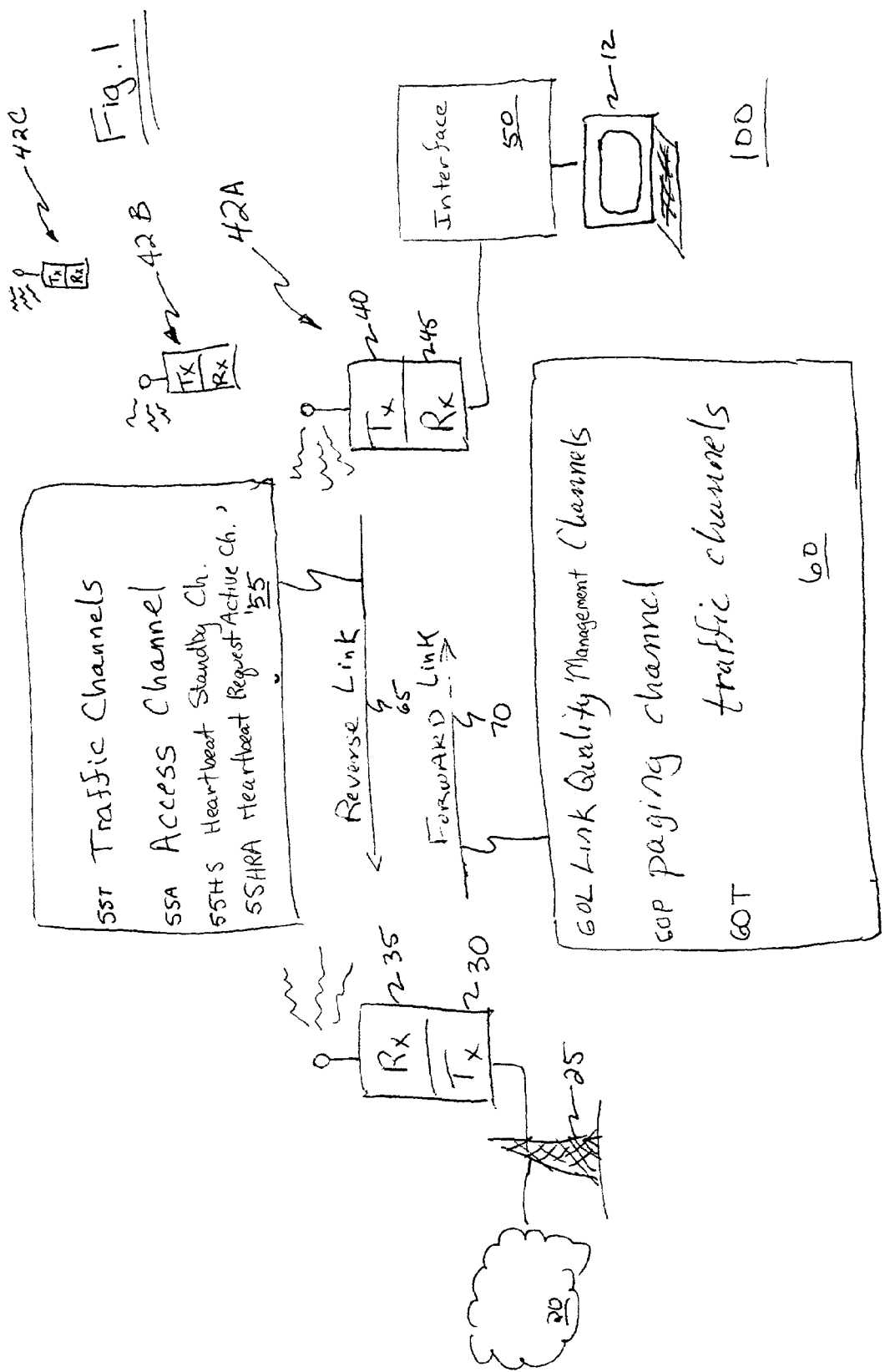
FIG. 1 is a general diagram illustrating a wireless communication system according to the principles of the present invention.

FIG. 1 is a diagram of a wireless communication system 100 according to the principles of the present invention. A base station 25 maintains wireless communication links with each of a plurality of field units 42A, 42B, 42C (collectively, field units 42) as shown. Such wireless links are established based upon assignment of resources on a forward link 70 and a reverse link 65 between the base station 25 and field units 42. Each link 65 or 70 is typically made up of several logical reverse link channels 55 and several logical forward link channels 60.

As shown, communication system 100 supports wireless communication between an interface 50 and network 20. Typically, network 20 is a Public Switched Telephone Network (PSTN) or computer network such as the Internet, internet or intranet. Interface 50 is preferably coupled to a digital processing device such as a portable computer 12, to provide wireless access to the network 20. Consequently, portable computer device 12 has access to network 20 based on communications over a combination of both hard-wired and wireless data links.

In a preferred embodiment, the forward link channels 60 and reverse link channels 55 are defined in wireless communication system 100 as Code Division Multiple Access (CDMA) channels. That is, each CDMA channel is preferably defined by encoding and transmitting data over the channel with an augmented pseudo random noise (PN) code sequence. The PN coded data is then modulated onto a radio frequency carrier. This enables a receiver to decipher one CDMA channel from another knowing only the particular augmented PN code assigned for a given channel. In accordance with the preferred embodiment, each channel preferably occupies a 1.25 MHz band consistent with the IS-95 CDMA standard and is capable of transmitting at 38.4 kbps.

Forward link channels 70 include at least three logical channels. As shown, this includes a Link Quality Management (LQM) channel 60L, a paging channel 60P, and multiple traffic channels 60T.

Reverse link 65 includes a heartbeat standby channel 55HS, heartbeat request active channel 55HRA, access channel 55A and multiple traffic channels 55T. Generally, the reverse link channels 55 are similar to the forward link channels 60 except that each reverse link traffic channel 60T can support variable data rates from 2.4 kbps to a maximum of 160 kbps.

Data transmitted between base station 25 and field unit 42A typically consists of encoded digital information, such as web page data. Based on the allocation of multiple traffic channels in the reverse link 65 or forward link 70, higher data transfer rates can be achieved in a particular link between the base station 25 and field unit 42A. However, since multiple field units 42 compete for bandwidth allocation, a field unit 42A may have to wait until resources are free to be assigned traffic channels to transmit a data payload.

Figure 2:
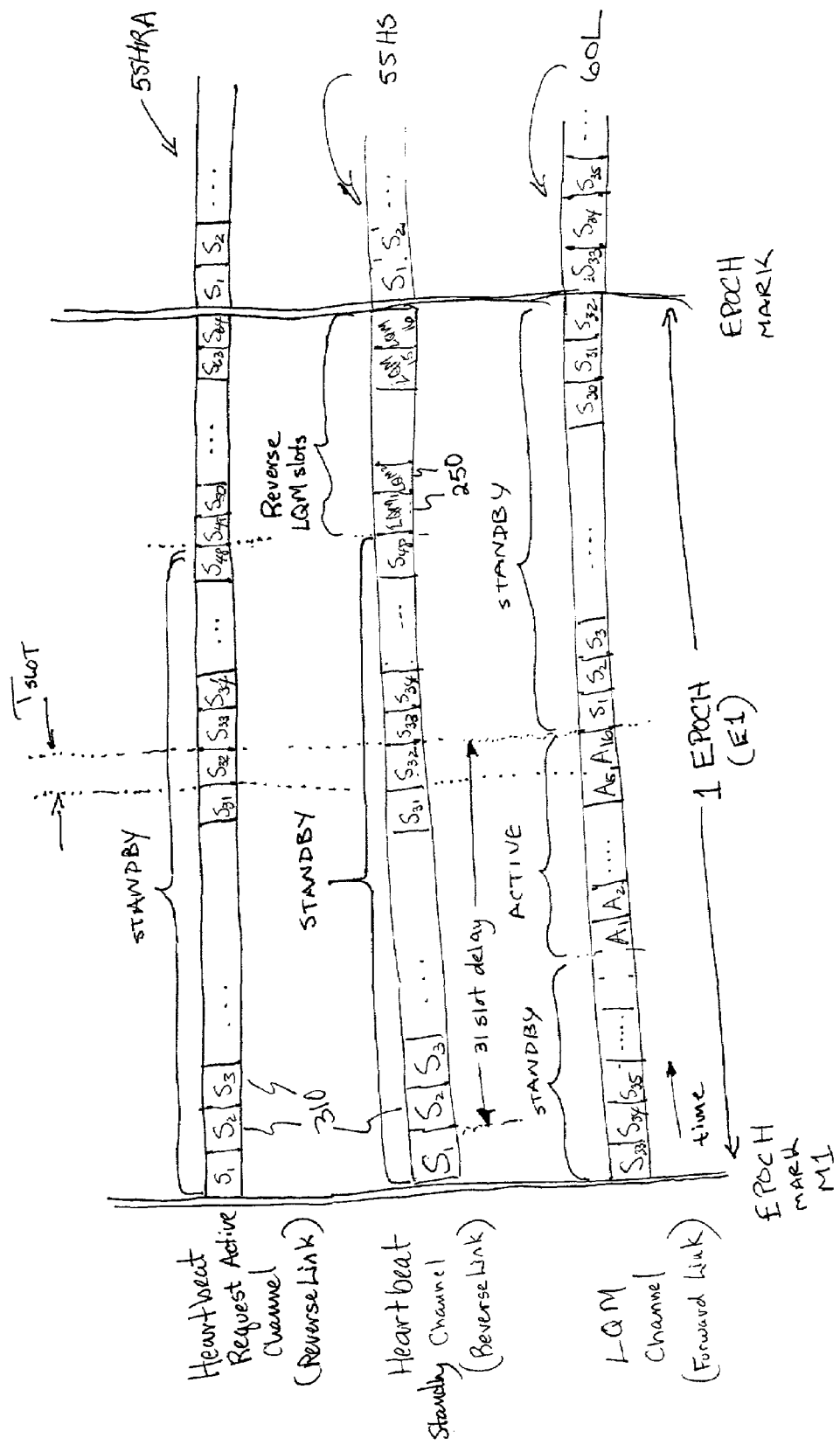
FIG. 2 is a timing diagram illustrating heartbeat and Link Quality Management (LQM) slot timing according to the principles of the present invention.

As shown in FIG. 2, the forward link LQM channel 60L is partitioned into a predetermined number of periodically repeating time slots 310 for the transmission of messages to each of multiple field units 42. Each field unit 42 identifies messages directed to itself based upon messages received in its assigned time slot 310. In other words, field units 42 monitor messages received in their respectively assigned time slots 310 to receive information from base station 25.

The reverse link heartbeat standby channel 55HS and heartbeat request active channel 55HRA are also shared among multiple users. These channels are both partitioned into periodically repeating time slots 310 so that the time slots 310 in each heartbeat channel align with each other and also the time slots of the LQM channel 60L. A time slot 310 of the reverse link heartbeat channels 55HS or 55HRA is assigned to one of many field units 42 for transmitting heartbeat-type messages to the base station 25 over either the heartbeat standby channel 55HS or heartbeat request active channel 55HRA. Accordingly, the base station 25 identifies from which field unit 42A a message is transmitted based upon the receipt of a message in a particular time slot.

The pair of shared channels in the reverse link are called heartbeat channels because one aspect of the present invention involves transmitting a minimal indication from a field unit 42A to keep it synchronized with the base station 25. The heartbeat channels 55HS, 55HRA and LQM channel 60L are described in more detail below.

As previously mentioned, another aspect of the present invention involves maintaining a minimal maintenance link between each of multiple field units and a base station 25 even when they are not presently transmitting a data payload in a reverse link direction. This scheme maintaining synchronization is particularly advantageous in applications where each of the multiple field units sporadically request to go active and transmit data in a reverse link. Since each of the field units 42 is already synchronized with the base station 25 via the minimal link, a field unit 42A can be assigned reverse link traffic channels 55 and, when assigned, almost immediately transmit a data payload in a reverse link direction without interfering with other channels. That is, a field unit 42A does not need to go through a lengthy process of re-synchronizing itself with the base station 25 when traffic channels are eventually assigned for its use.

In the following description, reference is again generally made to FIG. 1, but more specific details of LQM channel 60 and heartbeat channel 55H are referenced to FIG. 2.

To establish a synchronized link with base station 25, field units 42 transmit messages on access channel 55A to base station receiver 35 via field unit transmitter 40. These messages are then acknowledged and processed at base station 25. If available, resources are allocated by base station 25 to establish a bi-directional communication link with the requesting field unit 42A.

Within the forward link 70, the paging channel 60P is used by the base station transmitter 30 to send overhead and paging messages or commands to the field unit receiver 45. Overhead information includes data such as system configuration parameters for establishing wireless links with field units 42.

As mentioned previously, wireless communication system 100 includes a heartbeat channel 55HS and heartbeat request active channel 55HRA in the reverse link 65 and link quality management channel (LQM) 60L in the forward link 70. These channels are shared between the base station 25 and multiple field units 42. That is, the base station 25 transmits messages to multiple field units 42 using the same forward link LQM channel 60L, where a message to a particular field unit 42A is transmitted in an assigned time slot 310. In this way, time slot assignments serve as a way of addressing messages to a particular field unit and corresponding communication link.

The principles of the present invention are advantageously deployed to support users that require on-demand and sporadic high speed throughput of data on a wireless communication link. For example, remote users at PC device 12 can be connected to the Internet over a wireless link that supports on demand high speed throughput capability for downloading an object file such as a web page. Users can remain in a standby mode when no data payloads are transmitted in a reverse link direction. For example, use of a link can be minimal for a period of time so that the user can review a web page. To support such users, it is advantageous to maintain synchronization with the base station 25 even while the link is not actively being used to transmit or receive data. This is achieved in wireless communication system 100 by maintaining a minimal connection with the base station 25 even when no data is being actively transferred between the base station 25 and a specific field unit 42A.

One aspect of the minimal connection between a field unit 42A and base station 25 involves adjusting timing of the field unit 42A so that its timing is properly aligned with base station 25. Another aspect of the minimal connection involves adjusting the power level output of the field unit 42A so that it transmits at a low but detectable power level.

As mentioned, repeatedly creating or reviving connections for users who sporadically need a link can be time consuming and result in the inefficient use of resources. It is also inefficient to reserve resources such as traffic channels 55T on a continuous basis for subscribers who are not presently transmitting data. Accordingly, traffic channels 55T are allocated on an as-needed basis to support data transfers, optimizing the use of available resources in wireless communication system 100.

FIG. 2 is a timing diagram more particularly illustrating the heartbeat standby channel 55HS, heartbeat request active channel 55HRA and LQM channel 60L. Preferably, there are two LQM channels 60L combined with a total of four heartbeat-type channels including two heartbeat standby channels 55HS and two heartbeat request active channels 55HRA since coded channels are typically allocated in pairs. However, only one of each channel type is shown in FIG. 2 for illustrative purposes. Of course, the paired sets of channels can be used to support twice the number of users.

As shown, 64 time slots (in each direction) are defined per EPOCH period in each of the heartbeat standby 55HS, heartbeat request active channel 55HRA and LQM 60L channels. Up to 48 field units 42 in the standby mode can be supported along with up to 16 users in the active mode. The EPOCH period in the illustrated embodiment is 13.3 mS, so that each time slot is 208 mS or 256 PN code chips. Because time slots repeat on a periodic basis, the base station 25 can exchange information with a particular field unit 42 every EPOCH or 13.3 mS.

Data transmissions on the LQM channel 60L are maintained by base station 25, which is preferably used as a master timing reference. Field units 42, therefore, must synchronize themselves to base station 25, and specifically to the LQM channel 60L, in order to communicate with the base station 25 and transmit within an assigned time slot.

Figure 7:
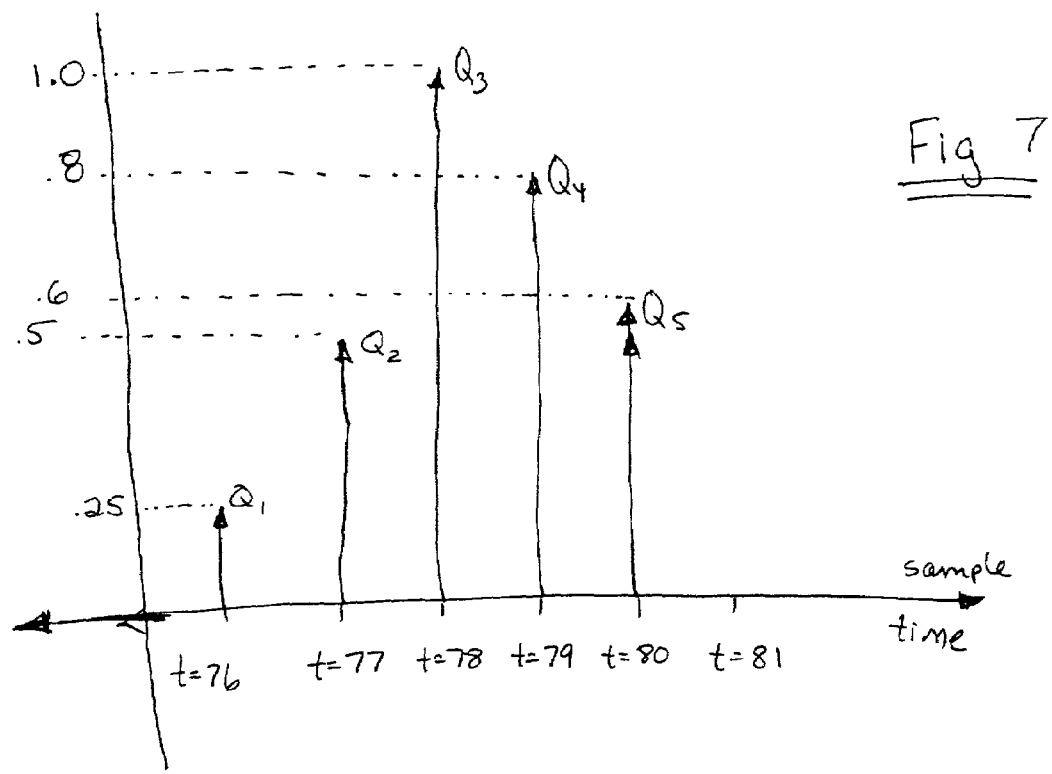
FIG. 7 is a graph illustrating pulse sampling techniques for identifying a timing mark for synchronizing forward and reverse channels according to the principles of the present invention.
Figure 1:
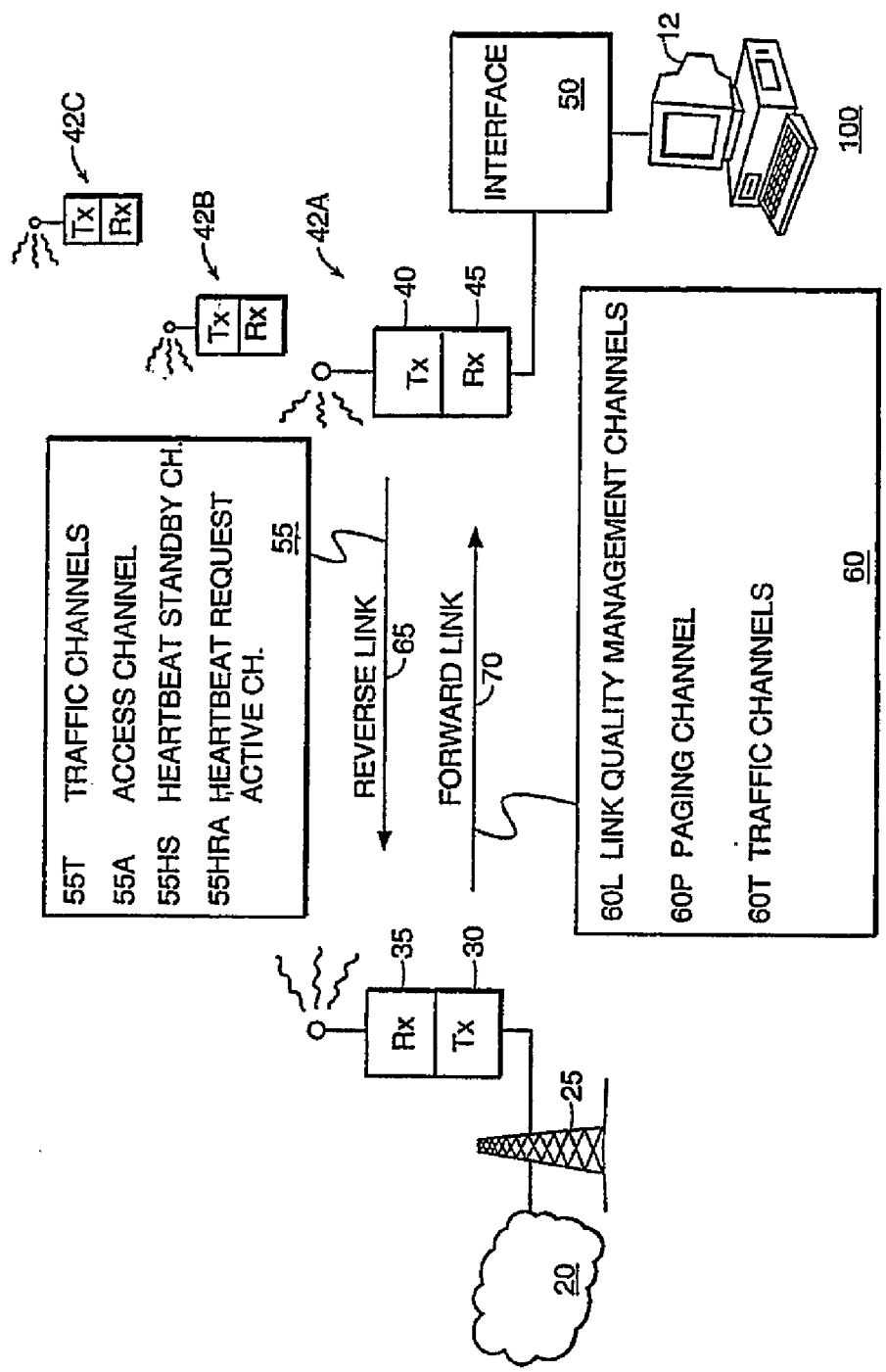
Figure 2:
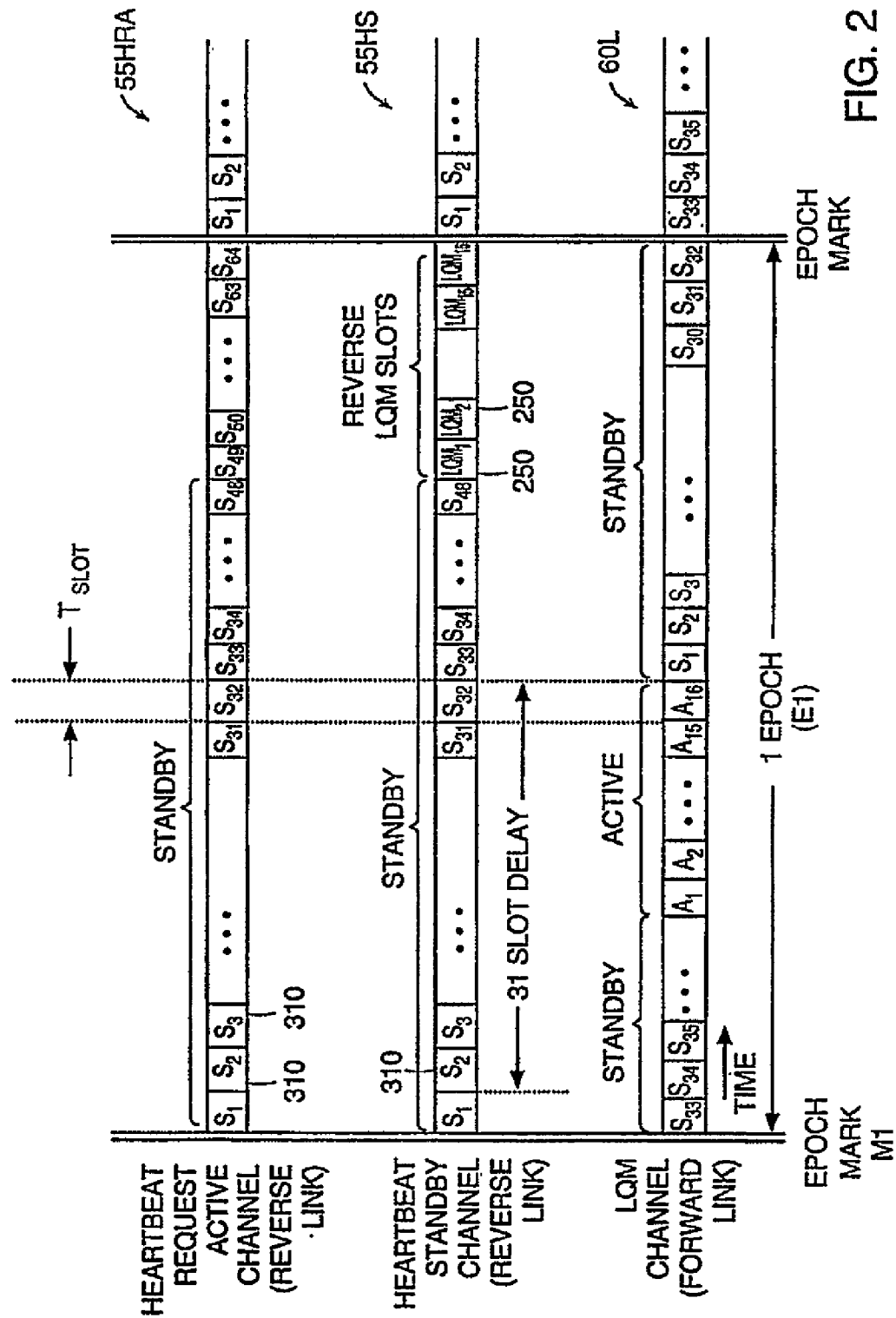
Figure 3:
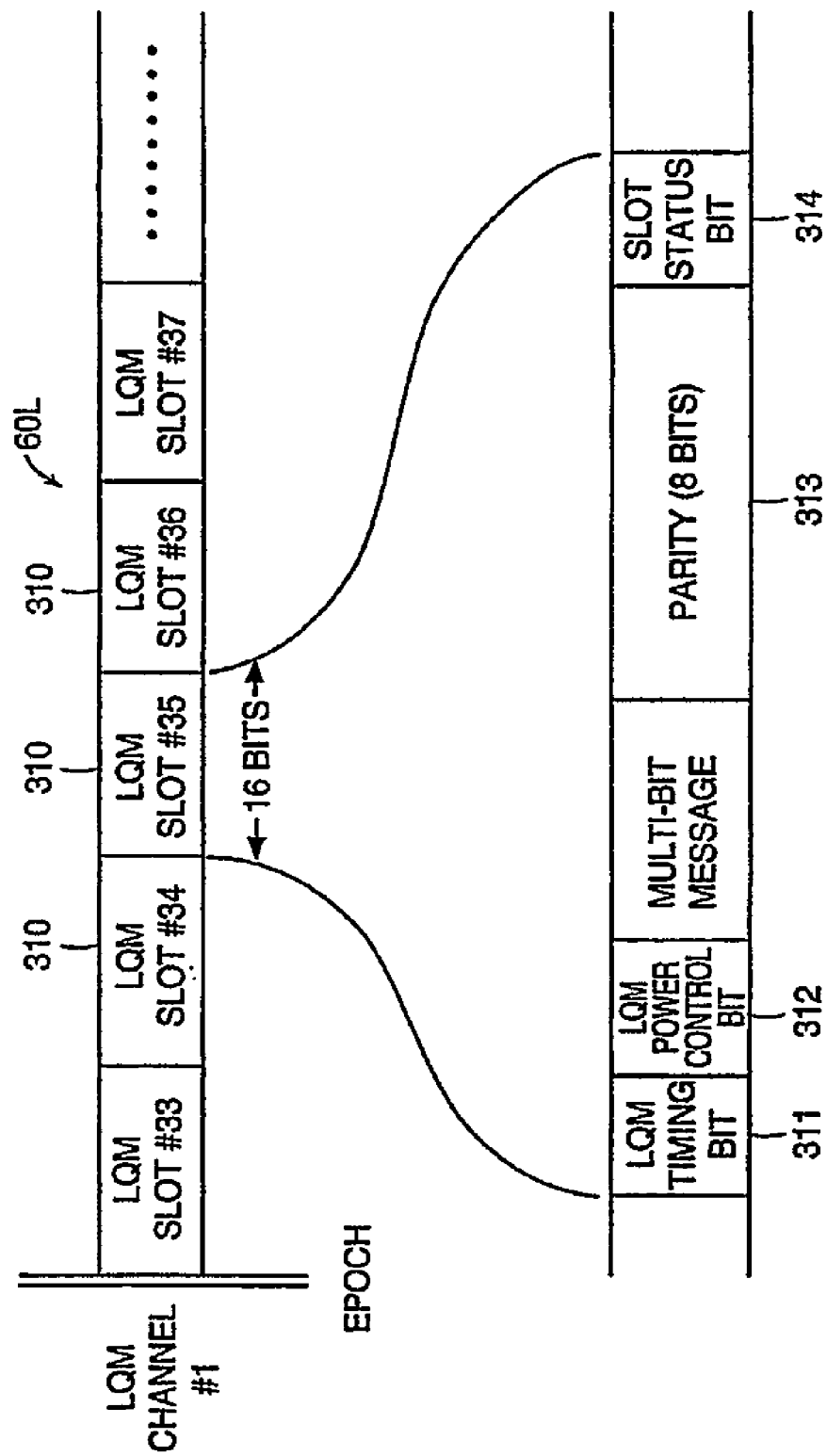
Figure 4:
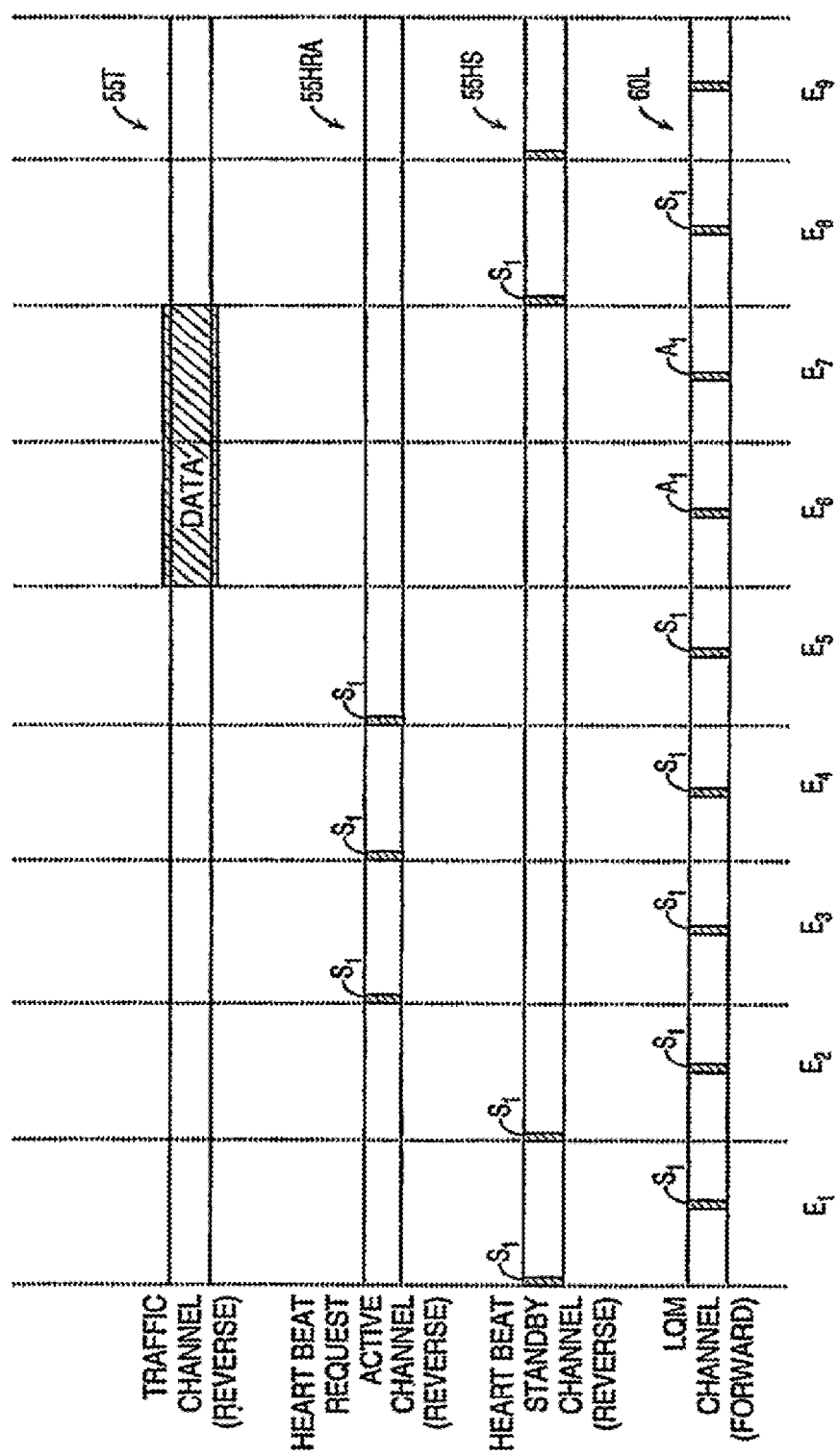
Figure 5:
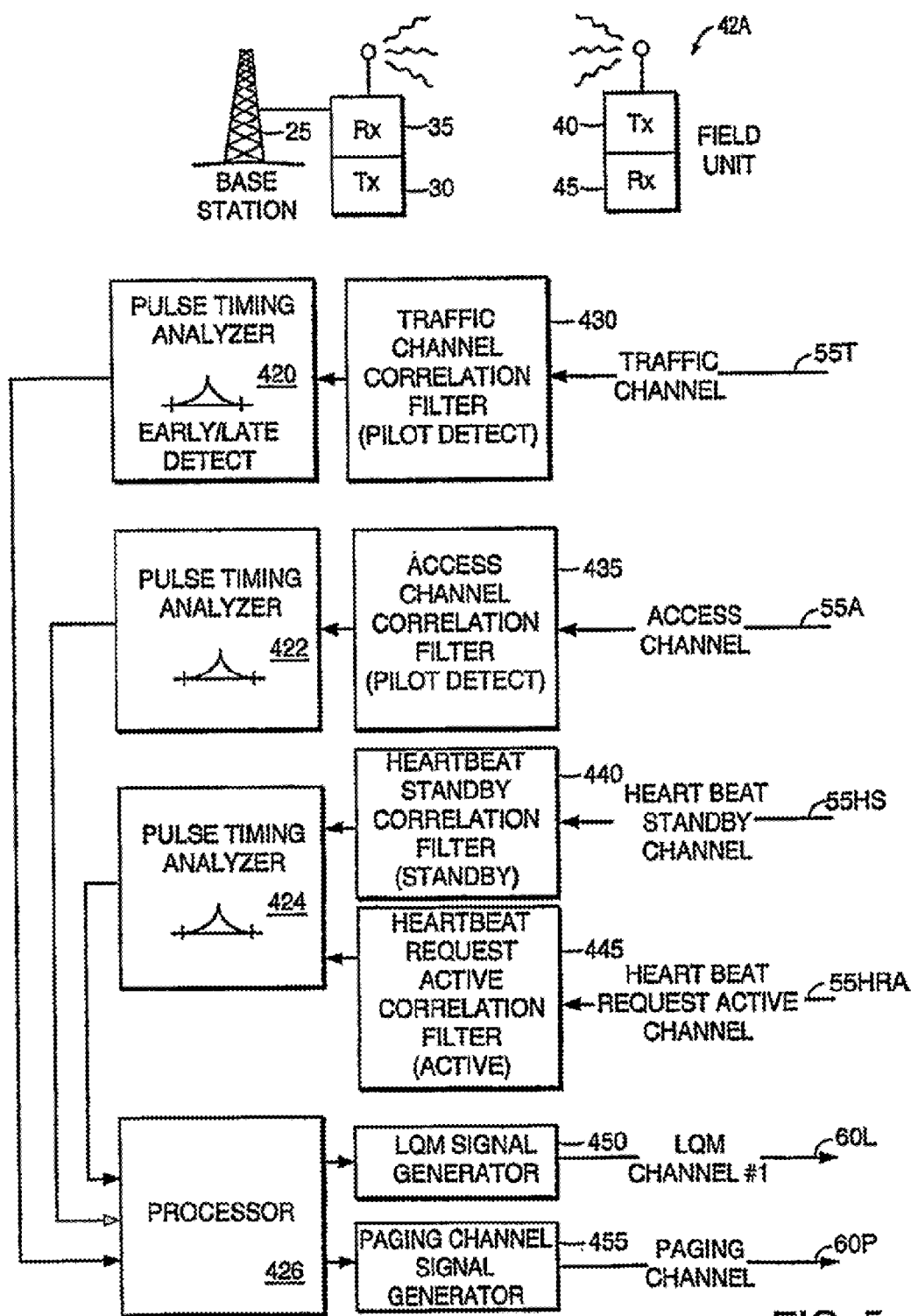
Figure 6A:
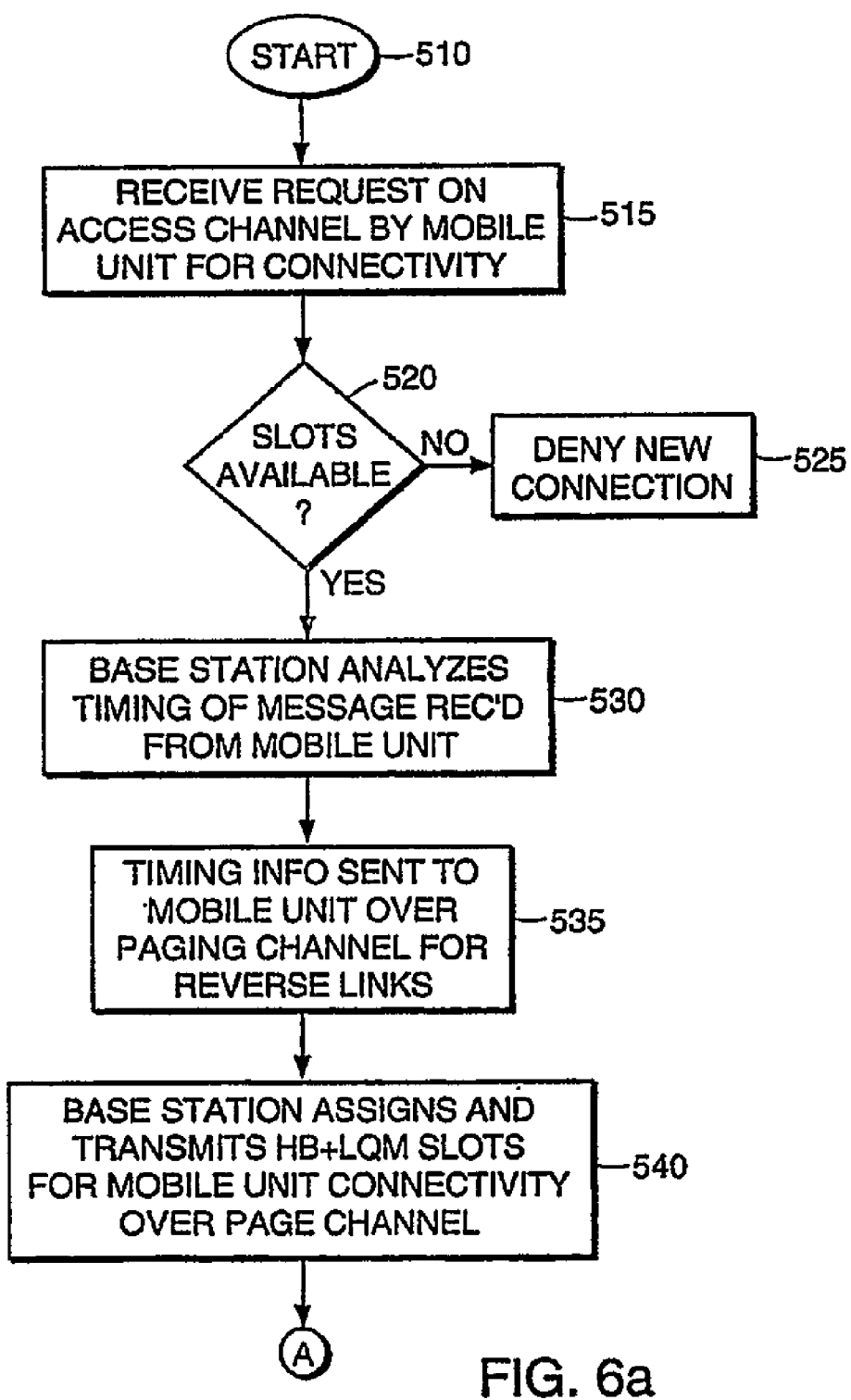
Figure 6B:
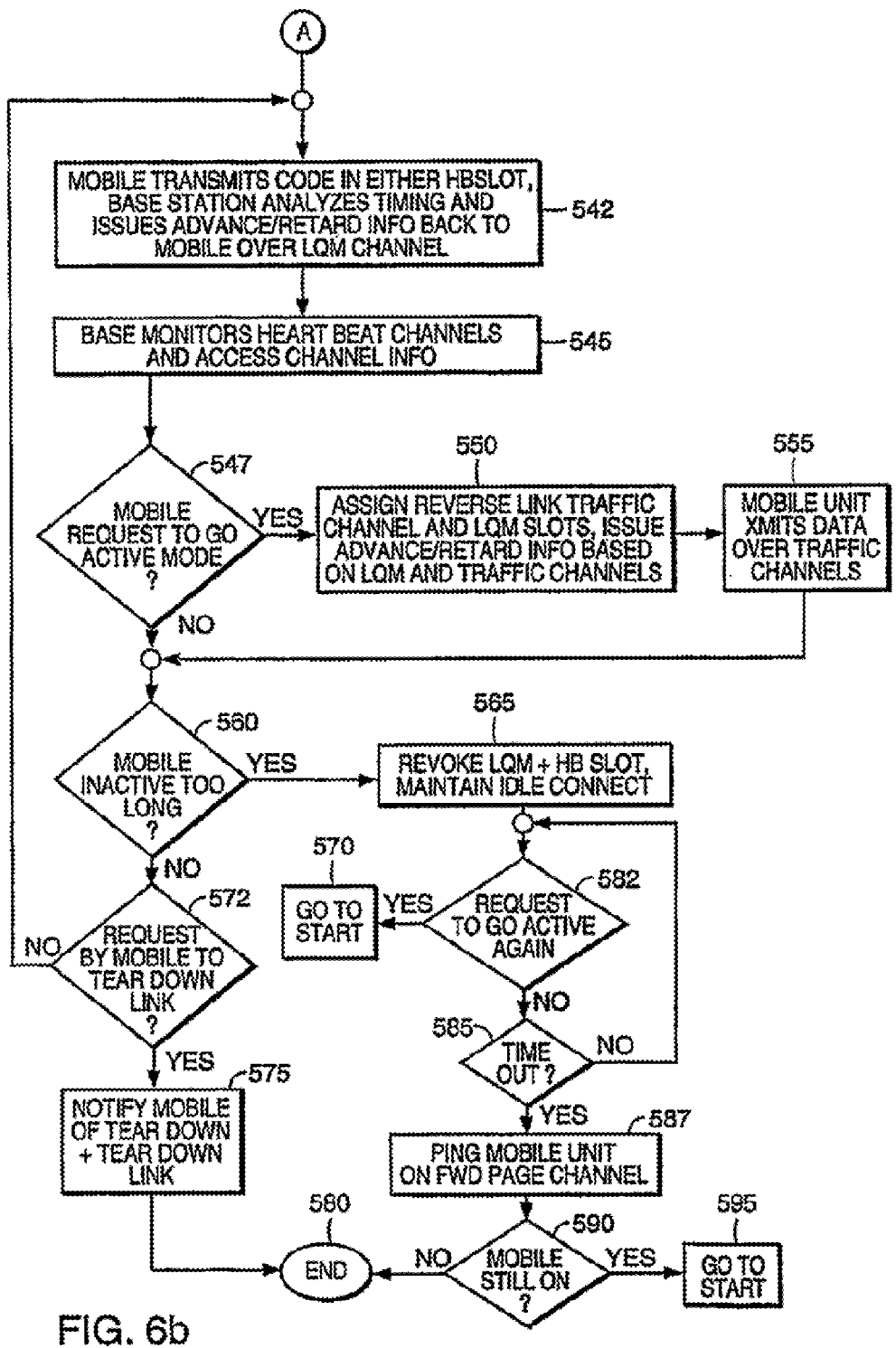
Figure 7:
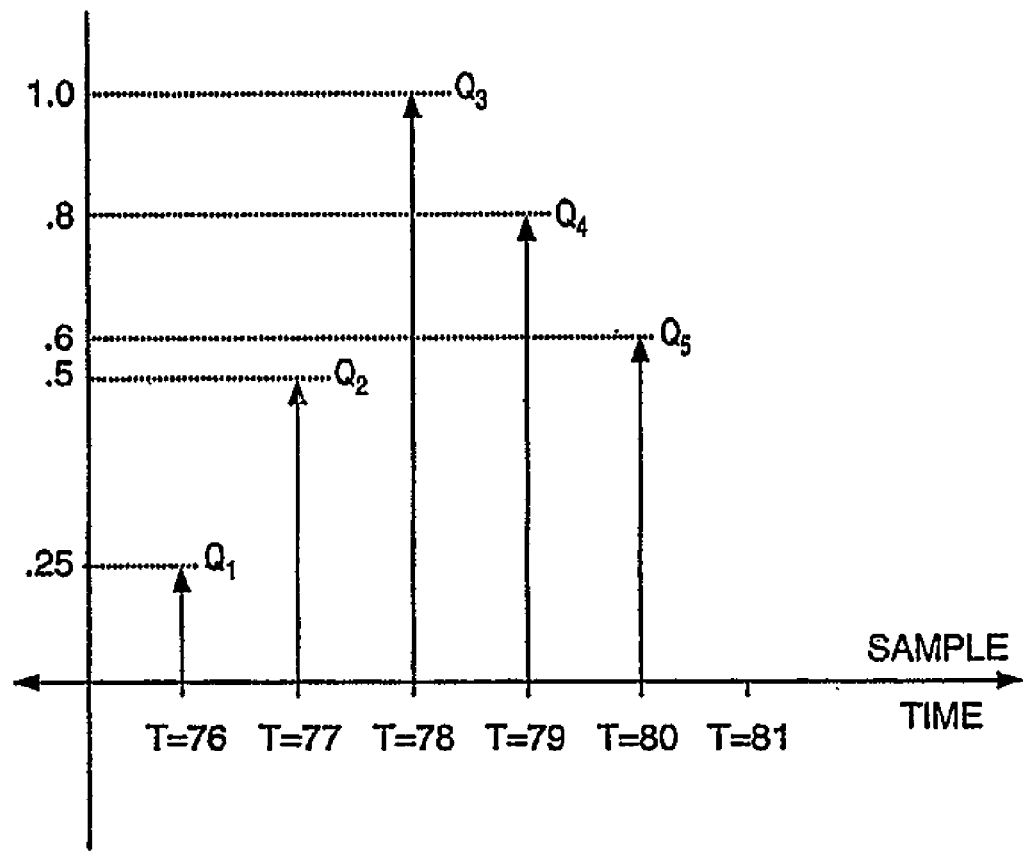

Generally, a link between base station 25 and a field unit 42A is maintained in one of three modes: active, standby or idle. Precise synchronization between the base station 25 and a particular field unit 42A is maintained only for field units 42 in the active and standby mode. FIG. 7 provides more details about mode types maintained for a particular link between the base station 25 and a field unit 42A. This aspect of the present invention will be discussed later in the specification.

Each field unit 42A in the standby or active mode is assigned one time slot in the forward link LQM channel 60L and one time segment in the reverse link heartbeat-type channels. Accordingly, information is targeted to a field unit 42A based upon the transmission of a message in a particular time slot. For example, a field unit 42A assigned to time slot #1 demodulates and decodes information received in time slot #1 on the forward link LQM channel 60L, while data transmitted back to base station 25 is transmitted by field unit 42A in time slot #1 of the reverse link heartbeat standby channel 55HS or heartbeat request active channel 55HRA. Both base station 25 and field unit 42A identify to which link a message is directed based on receipt of a message in a particular time slot 310.

Preferably, there is a timing offset between time slots in each respective channel, allowing the base station time to process a message received in an assigned time slot and then respond accordingly over the LQM channel 60L in a following portion of a cycle. Thus, messages transmitted over the LQM channel 60L include feedback messages that are used to adjust transmitting characteristics of a field unit 42A.

It should be noted that although the LQM channel 60L is used as a timing reference as described above, the principles of the present invention equally apply where the heartbeat-type channels 55HS and 55HRA are used in a forward link and LQM-type channel is used in a reverse link. In other words, base station 25 is optionally synchronized with respect to a field unit 42A.

In the standby mode, synchronization is maintained between the forward link LQM channel 60L and reverse link heartbeat standby channel 55HS based upon messages sent in the appropriate time slot on the LQM channel 60L indicating to a particular field unit 42 whether messages transmitted to the base station 25 from that field unit 42 are received in the appropriate time slot. For example, message transmissions from the field unit transmitter 40 to base station 25 are analyzed at base station receiver 35 to achieve fine tuning alignment between the base station 25 and each of multiple field units 42.

As shown in FIG. 2, time slots $A_1$ through $A_{16}$ of the LQM channel 60L are reserved for field units 42 in the active mode, indicating that traffic channels are assigned to a field unit 42A in a reverse link direction and data is being transferred from the field unit 42 to the base station 25. Contrariwise, time slots 1–48 of the LQM channels 60L are reserved for field units 42 operating in the standby mode that are not presently transmitting a data payload over a reverse link of communication system 100.

At any given time, there are preferably no more than 48 of the 64 time slots of the heartbeat channel 55H or LQM channel 60L assigned to respective field units 42. This ensures that on completion of a data transfer between a field unit 42A and base station 25, a field unit 42A in the active mode assigned an active time slot can revert back to the standby mode and consequently be assigned an unused standby mode time slot 310 again.

Preferably, field units 42 in the standby mode are assigned an unused active time slot 310 as close to the EPOCH mark M1 as possible when they are placed in the active mode. For example, if 48 field units are assigned standby mode LQM slots $S_1, S_2, \ldots S_{48}$, a field unit 42A set to the active mode would be assigned active mode time slot $A_1$ in the LQM channel. The next active time slot 310 to be assigned to a field unit 42A would be the lowest numbered and unused time slot such as $A_2$, assuming $A_1$ is then in use.

It should be noted that heartbeat standby channel 55HS also includes additional time slots for transmitting messages from an active field unit 42A, i.e., a field unit 42A transmitting data in a reverse link over assigned traffic channels, to base station 20. Preferably, reverse LQM time slots 250 are allocated for transmitting link quality information from a corresponding active field unit 42A to base station 20. In this way, base station 20 can be notified of a corresponding link quality of transmissions on forward channels between the base station 20 and field unit 42.

In a specific application utilizing the reverse LQM time slots 250, a field unit 42A can monitor the quality of a forward link signal from the base station 20 and transmit a modulated message including forward error correction information to the base station 20 in an assigned LQM time slot 250. Based on these feedback messages transmitted in an LQM time slot 250, properties of the transmitted signal from base station 20 can be adjusted so that subsequent messages on the forward link channels to the field unit 42A can be properly detected. For instance, field unit 42A can monitor whether a signal transmitted by the base station 20 on a forward link traffic channel is transmitted at an appropriate power level so that the power level of the received signal is within a desired range, e.g., a selected signal-to-noise ratio. In this instance, the message sent in the reverse LQM time slot 250 can indicate whether base station 20 should increase or decrease its power level output on the forward channel.

The heartbeat standby channel 55HS therefore supports at least two types of communications between multiple field units 42 and base station 20. A first field unit 42A in the standby mode transmits a timing reference signal that is monitored at base station 20 for adjusting timing alignment of the corresponding filed unit 42A. As recently discussed, a second field unit 42B in the active mode is assigned a reverse LQM time slot 250 for transmitting a message to base station 20. Preferably, the message transmitted in a reverse LQM time slot 250 includes a data message that is demodulated and decoded at base station 25 to determine the contents of the message.

The mere RF (Radio Frequency) transmission in a time slot on the heartbeat standby channel 55HS by a field unit 42A in the standby mode itself is an indication to the base station 20 that the field unit 42A desires to remain in the standby mode. As mentioned, the latter transmission by a field unit 42A in the standby mode preferably does not include an encoded and modulated message including forward error correction information.

Figure 3:
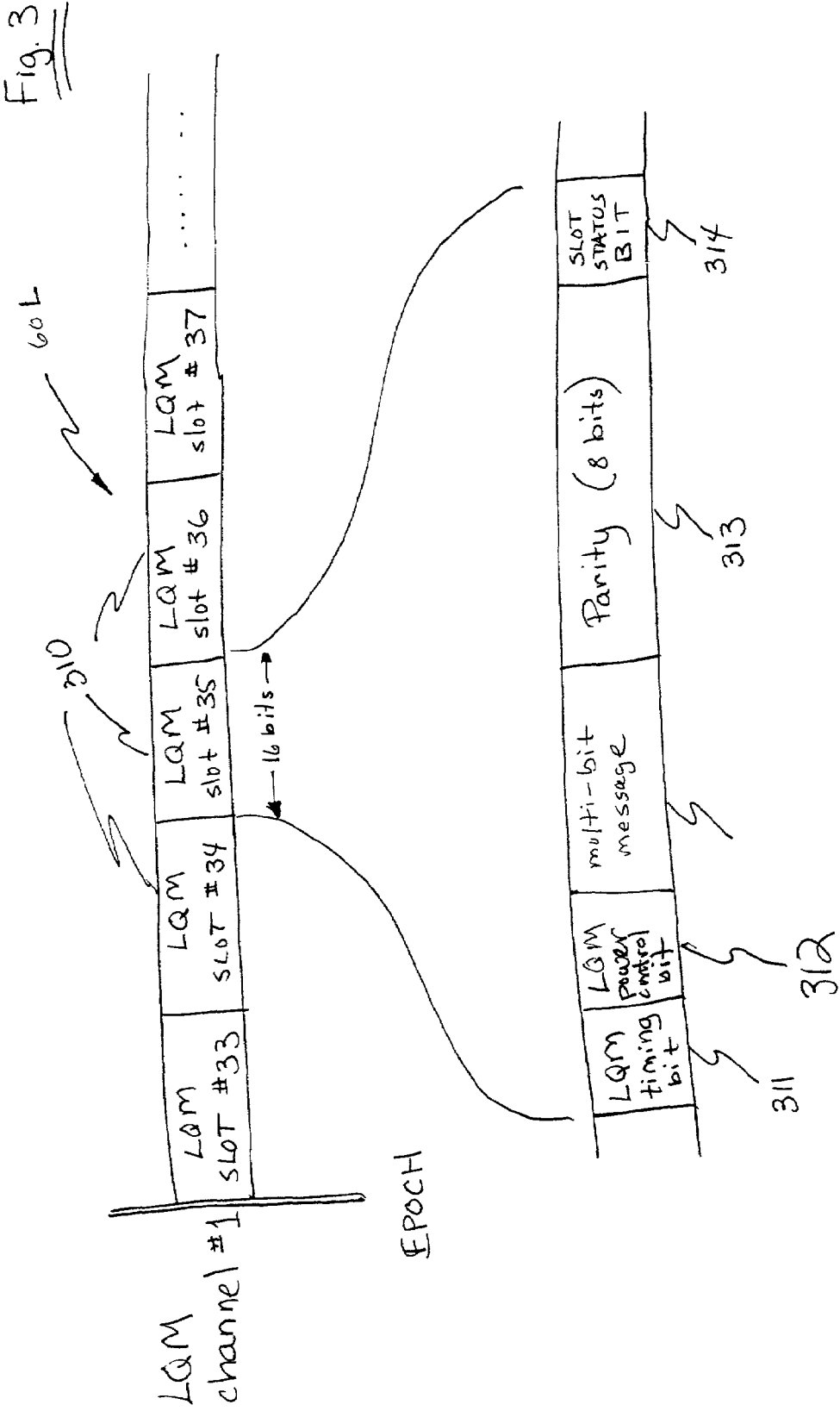
FIG. 3 is a diagram illustrating an exemplary bit definition of an LQM slot according to the principles of the present invention.

FIG. 3 is a timing diagram illustrating an exemplary mapping of bits in a forward link LQM time slot 310 according to the principles of the present invention. As shown, there are 16 bits transmitted in each time slot 310, although this can vary depending on the application. One bit of the LQM time slot 310 is LQM timing bit 311 that indicates whether a field unit message transmission received at the base station 25 on a last message cycle is accurately received within an assigned time slot 310. This ensures that other field units 42 transmitting messages in adjacent time slots of the same reverse link channel 65 do not interfere with each other.

In a preferred embodiment, the LQM timing bit 311 indicates whether a field unit 42A is to advance or retard its timing on the reverse link 65. A logic one indicates that timing should be advanced ⅛ of a chip while a logic zero indicates that timing should be retarded ⅛ of a chip. In this way, the base station 25 individually synchronizes communication links between the base station 25 and each of a plurality of field units 42. Said differently, timing of message transmissions from corresponding field units 42 are frequently adjusted, so that corresponding messages are received in the assigned time slots at the base station 25. Consequently, a field unit 42 can synchronize itself with the base station 25 even though it is moving very fast relative to the base station 25.

In a preferred embodiment, the base station 25 transmits information on the LQM channel 60L based on BCH coding. This enables a receiving field unit 42 to detect and correct errors. For example, the use of a 15,7 code allows up to 2 errors to be corrected and up to 3 errors to be detected. As shown in FIG. 3, there are 8 parity bits 313 for error correction and detection.

Referring again to FIG. 2, a timing diagram illustrates the heartbeat standby channel 55HS and heartbeat request active channel 55HRA. As shown, time slot numbering is selected for both channels so that they line up with each other. For example, time slot #1 for each heartbeat channel are aligned with each other in a given time segment, $T_{SLOT}$.

The heartbeat standby channel 55HS and heartbeat request active channel 55HRA serve different functions. For example, a field unit 42A assigned use of a particular time slot 310 transmits over the heartbeat standby channel 55HS in order to provide an indication to base station 25 that the field unit 42 desires to remain in the standby mode. On the other hand, a field unit 42A alternatively transmits over the appropriate time slot 310 of the heartbeat request active channel 55HRA to provide an indication to the base station 25 that the field unit 12 desires the allocation of reverse link traffic channels for transmitting a data payload from the field unit 42A to base station 25.

In a preferred application, the heartbeat standby channel 55HS, heartbeat request active channel 55HRA and LQM channel 60L are all defined by unique code such as long PN (Pseudo-Random Noise) codes. Accordingly, base station 25 detects a message from a field unit 42A in an assigned time slot by detecting whether or not a field unit 42A transmits an RF (Radio Frequency) signal over the corresponding uniquely coded channel. A transmission within an assigned time slot of either heartbeat channel need not include a meaningful data payload that must be demodulated because the mere coded RF transmission by a field unit 42A within a time of a channel itself indicates to base station 25 whether the corresponding field unit 42A desires to remain in the standby mode or go active.

In one application, field unit 42A transmits unmodulated data including a short PN code, a long PN code, and an orthogonal code such as a Walsh code in an assigned time slot 310 of the heartbeat-type channel, i.e., the heartbeat standby channel 55HS of the heartbeat request active channel 55HRA. Thus, the message as received in a time slot 310 is easily identified without having to decode a corresponding data payload message. A field unit 42A can then transmit at a lower power level than would otherwise be necessary if the field unit transmitted an indication including a coded message or data payload.

Since field units 42 transmit during an assigned time segment over only one of the pair of heartbeat channels including heartbeat standby channel 55HS and heartbeat request active channel 55HRA, the combination of transmitted RF power on these channels is effectively that of a single channel.

A marker is preferably included within a time slotted message of either heartbeat channel so that base station 25 can analyze whether a corresponding field unit 42 is properly synchronized. More specifically, field unit 42 transmits a marker at a predetermined position in a time slot 310 and base station 25 then sends a message in the appropriate time slot 310 of the forward link LQM channel 60L to indicate whether the field unit should advance or retreat its timing of future message transmissions.

Another aspect of the present invention involves maintaining a power feedback loop between each of multiple field units 42 and base station 25. The indication transmitted in a time slot of the heartbeat standby channel 55HS or heartbeat request active channel 55HRA is analyzed at base station 25 to determine the strength of the received RF signal as transmitted by a corresponding field unit 42A. For example, the power output of a field unit 42A can be adjusted based on a signal-to-noise ratio of the signal received at base station 25. If the signal strength is lower than a desired level or outside a specified range as detected by base station 25, a feedback message generated by base station 25 is communicated to the field unit 42A in the appropriate forward link for adjusting its power level for subsequent transmissions on the heartbeat type channels. In this way, the power level of a field unit 42A can be adjusted to reduce co-channel interference based on power adjustment messages transmitted to a field unit 42A in successive LQM time slots 310. The power level of a transmitting device can be gradually increased or decreased so that it has minimal impact on other channels.

The aforementioned method of adjusting the power output level of a field unit 42A is similar to the method as previously described for synchronizing a field unit 42A to base station 25 via feedback messages. However, in the power feedback control loop, the power level output of the field unit 42A is adjusted via feedback messages instead of timing. Thus, the power level of a field unit 42A can be adjusted while in a standby mode so that, in the event that the transmitter goes active transmitting a data payload to the receiver, the power level of the transmitter is optimized to reduce co-channel interference.

The power feedback loop provides a reference for transmitting an RF signal at a specified power level so that the field unit 42A can determine at what level the field unit 42A should transmit an FEC (Forward Error Correction) coded message over other channels such as reverse link traffic channels. More specifically, a field unit 42A recently assigned to the active mode can determine at what level to transmit a data payload to base station 25 depending on the modulation-type and FEC code to be used for transmitting the data payload using the power level transmission on the heartbeat channel as a reference.

Both power and timing feedback loops can be implemented simultaneously so that the power output level and timing of a field unit 42A is optimized for potentially sporadic data transmissions. Thus, power and timing of a field unit 42A is optimally adjusted even in a dynamic environment where the signal to noise ratio and signal path transmission delay of the field unit 42A changes almost instantaneously. A link is maintained even during changing environmental conditions.

In the standby mode, power level optimization is achieved based upon messages sent in the appropriate time slot 310 on the LQM channel 60L indicating to a particular field unit 42A whether RF transmissions form the field unit 42A to the base station 25 are received at an appropriate power level. For example, signal transmissions from the field unit transmitter 40 to base station 25 are analyzed at base station receiver 35 to achieve fine tuning power level adjustments for each of multiple field units 42.

FIG. 3 is a timing diagram illustrating an exemplary mapping of bits in a forward link LQM time slot 310 according to the principles of the present invention. As shown, there are at least 16 bits transmitted in each time slot 310, although this can vary depending on the application.

One bit of the LQM time slot 310 is LQM power level control bit 312 that indicates whether a field unit transmission on the heartbeat standby channel 55HS or heartbeat request active channel 55HRA received at base station 25 in a previous Epoch cycle is detected to be within a desired power level range. This feedback message in the LQM time slot 310 is monitored at the field unit 42A to adjust the power output level of the field unit 42A so that power output of the field unit 42A is minimal but detectable at base station 25. Of course, the power output level of the field unit 42A is adjusted above the minimal detectable level so that transmissions from the field unit 42A are still detectable even if there is a slight change in environmental conditions.

Notably, if the transmission by a field unit 42A is so low that it is not detectable at base station 25, a feedback message in the LQM time slot 310 will be generated indicating that the field unit 42A shall increase its power output level a predetermined amount so that the base station 25 can hopefully detect a transmission by the field unit 42A in a following Epoch. Power feedback messages transmitted over multiple Epochs to the field unit 42A can be used to gradually adjust its power output level. This gradual change in power output by the field unit 42A minimally impacts the quality of other channels. In other words, the field unit 42A preferably does not transmit at such a high power level that it causes undue interference with other field units 42 transmitting on other coded channels.

In a specific application, the LQM power level control bit 312 indicates whether a field unit 42A is to increase or decrease its power level output for transmissions on the reverse link 65. A logic one indicates that timing should be increased by, for example, ½ dB while a logic zero indicates that power level output of the field unit 42A should be decreased by ½ dB so that the received signal at base station 25 falls within a desired signal-to-noise ratio range. In this way, base station 25 individually adjusts the power level of communication links between the base station 25 and each of a plurality of field units 42. Said differently, power output levels of corresponding field units 42 are frequently adjusted, so that corresponding indications are received at a desired power level at base station 25. Consequently, the power output level of a field unit 42 can be continuously adjusted so that it is optimally set even though the field unit 42A may be moving very fast relative to the base station 25, i.e., the reverse link path loss may be changing and the power output level of the field unit 42A will be adjusted accordingly for supporting continued communications with base station 25.

As mentioned, power adjustments are made at the field unit 42A based upon the state of the LQM timing bit 312. Initially, timing is adjusted by a first predetermined amount such as ½ dB in the appropriate direction depending on the state of this bit. However, if the field unit 42A receives 8 "increase" power bits in a row or 8 "decrease" power bits in a row over as many EPOCHs, power adjustments of the field unit 42A are based on 1 db instead of ½ dB for the following LQM power control bits 312 of the same state. In this way, the optimal power output level of the field unit 42A can be achieved more quickly when the power level for a link is grossly out of adjustment.

Once the field unit 42A determines that the power output level is overcorrected, i.e., the polarity of the LQM timing bit 312 changes state from one epoch to the next, power output adjustments at the field unit 42A revert back to ½ db for each subsequently received LQM power control bit 312. When power synchronization is achieved between a field unit 42 and base station 25, the LQM power control bit 312 will typically be set to alternating logic ones and zeros for several successive EPOCH cycles. In other words, power control output at the field unit will jitter ½ dB when synchronization is practically achieved between the base station 25 and field unit 42A. This amount of jitter is tolerable for maintaining such synchronization links. Of course, a filter can be implemented at the field unit 42A so that the power output does not jitter from one Epoch to the next of the filed unit 42A.

Rather than transmit a single LQM power control bit 312, the LQM timing slot 310 can also include a multi-bit message indicating an amount that the corresponding field unit 42A is to increase or decrease it power output level.

Figure 4:
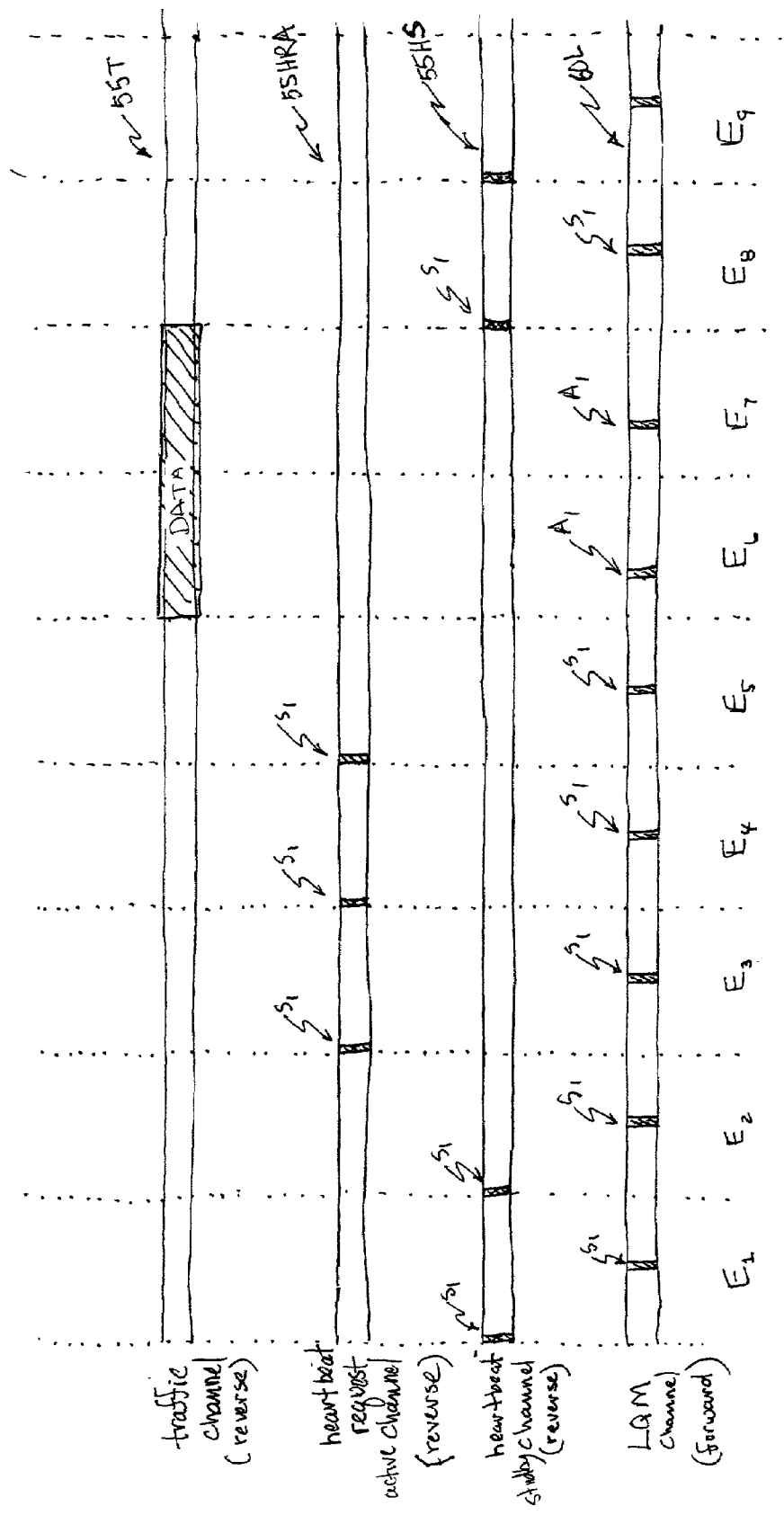
FIG. 4 is a graph illustrating a field unit requesting to go active and the allocation of traffic channels to transmit a data payload in a reverse link direction according to the principles of the present invention.

FIG. 4 is a timing diagram illustrating a field unit 42A requesting to be assigned reverse link traffic channels according to the principles of the present invention. As shown, a field unit 42A in the standby mode is assigned a particular time slot 310 in Epoch $E_1$. As previously discussed, the field unit 42A transmits over the assigned time slot 310 of the heartbeat standby channel 55HS to remain in the standby mode. In response to this reverse link indication from the field unit 42A, base station 25 transmits a feedback message in the appropriate time slot 310 of the LQM channel 60L in Epoch $E_1$ for maintaining synchronization of the link. As discussed, this feedback message can include both power and timing control adjustment information.

Epoch $E_2$ illustrates a similar circumstance where the field unit 42A continues requesting to remain in the standby mode. Consequently, the repetitive function of monitoring a timing marker within a time slot 310 and providing corresponding feedback in the reverse link over the LQM channel 60L ensures that the corresponding link is synchronized in the event that the field unit 42 desires to transmit a data payload in a reverse link direction.

In following Epoch $E_3$, field unit 42A indicates to base station 25 a request to go active so that it will be assigned reverse link traffic channels to transmit a data payload. As mentioned, this is achieved by generating an RF signal in the appropriate time slot 310 of the heartbeat request active channel 55HRA. Depending on a number of available reverse link traffic channels, there can be a delay between the time a field unit requests to go active and the time traffic channels are actually assigned for use by the field unit 42A. Thus, it is desirable to repeat a request to go active by transmitting in an assigned time slot 310 of the heartbeat request active channel 55HRA at the base station 25. Since timing adjustment feedback messages are also transmitted to the field unit 42A based on messages received on the heartbeat request active channel 55HRA, precise synchronization and power control of the corresponding link between base station 25 and field unit 42 is maintained for subsequent Epochs $E_4$ and $E_5$.

Prior to or during Epoch $E_5$, field unit 42A is notified which traffic channels are allocated for transmitting its data payload in a reverse link direction.

Epoch $E_6$ and $E_7$ illustrate that field unit 42A has been assigned use of reverse link traffic channels 55T for transmitting a data payload. Notably, the field unit 42A no longer transmits an indication to the base station 25 over either the heartbeat standby channel 55HS or the heartbeat request active channel 55HRA. However, a link quality message is still transmitted in a forward link direction from the base station 25 to adjust timing of the field unit 42. The timing adjustment feedback messages are based on markers transmitted over the reverse link traffic channels 55T. As shown, in Epoch $E_6$ and $E_7$, an LQM message is transmitted to the field unit 42A in a newly assigned active time slot between $A_1$ and $A_{16}$. Thus, transmissions from the base station 25 to field unit 42A have shifted to a new time slot 310. Of course, prior to Epoch $E_6$, field unit 42A must be notified of the traffic channels 55T on which it is to transmit a data payload and the newly assigned active time slot 310 in which the field unit 42A is to receive a time-slotted LQM message.

As mentioned, markers are included with the data payload transmissions over the reverse link traffic channel 55T to base station 25 where they are analyzed. In this instance, the minimal feedback timing adjustment messages are generated based on the markers received within the reverse link traffic channels 55T. The timing adjustment messages are transmitted in the newly assigned active time slot $A_1$ of the forward link LQM channel 60L.

After a data payload is transmitted over the reverse link traffic channel 55T, the field unit 42A is placed in the standby mode as shown in Epoch $E_8$ and $E_9$. Accordingly, synchronization is again maintained based on a feedback loop between a field unit 42A and base station 25. More specifically, messages transmitted in a time slot 310 of the heartbeat standby channel 55HS are again analyzed at base station 25 and timing adjustment feedback information is transmitted in the standby time slot $S_1$ of the forward link LQM channel 60L to precisely synchronize the field unit 42A with the base station 25.

Figure 5:
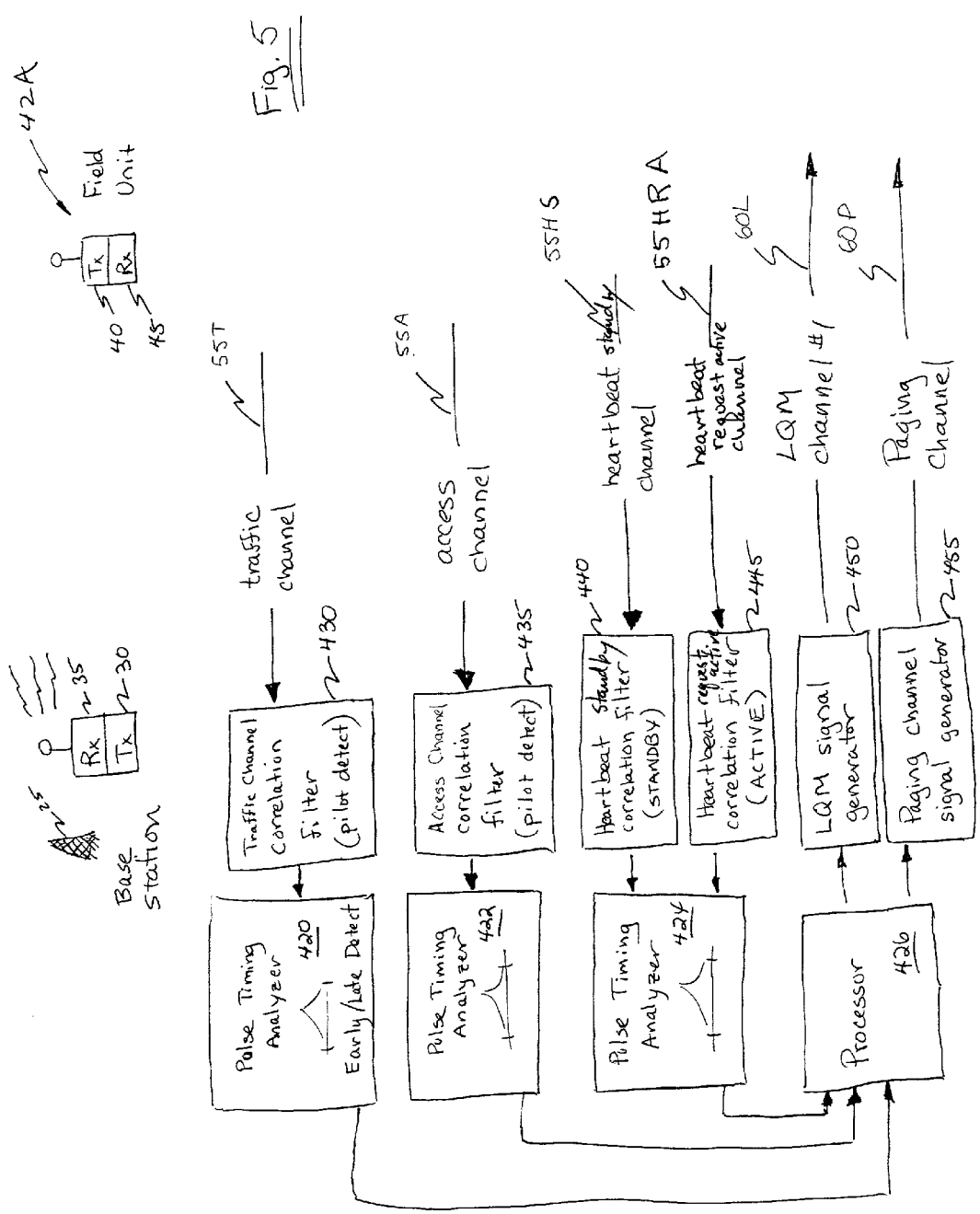
FIG. 5 is a block diagram supporting channel synchronization according to the principles of the present invention.

FIG. 5 more particularly shows hardware components at base station 25 that are used to achieve synchronization and power control of the reverse link 65 and forward link 70. Information transmitted in a time slot 310 as assigned for use by a field unit 42A is analyzed by a corresponding heartbeat correlation filter such as heartbeat standby correlation filter 440 or heartbeat request active correlation filter 445. Generally, the unique codes of each heartbeat channel are monitored in different time slots 310 to detect a request by a corresponding field unit 42A to be placed in the active mode or remain in the standby mode. Thereafter, the base station 25 will set field unit 42A to the active mode by assigning it the appropriate resources if a request to go active is detected. Note that heartbeat standby correlation filter 440 is used to identify a long PN code corresponding to a request by the field unit 42A to remain in the standby mode, while heartbeat request active correlation filter 445 at base station 25 identifies a long PN code corresponding with a request to be placed in the active mode.

Regardless on which heartbeat-type channel a field unit 42A transmits in an assigned time slot 310, the marker from the field unit 42A is monitored by a pulse timing analyzer 422. It is then determined whether the message transmission by a corresponding field unit 42A is received early or late within a time slot 310 at base station 25. Preferably, the strongest received diversity string in a time slot 310 will be designated as the time alignment string for analyzing timing of the message received over heartbeat standby channel 55HS or heartbeat request active channel 55HRA.

Time slot alignment is preferably based on the correlation profile of the pilot in a particular string, which is analyzed using correlation filters as mentioned. The output of the correlation filters 440, 445 include 256 samples, which represent 64 lags at 4 samples per lag. The 256 sample output-window represents the total correlation time span of the base station 25. Preferably, the time alignment point or marker in a time slot 310 is sample number 80, which allows 20 lags for precursor and 44 lags for post cursor channel information.

Generally, the computation of the time alignment error is based on a determination of where the centroid or peak lies in a given sample string. For example, each field unit 42A transmitting in its assigned time slot 310 over either the heartbeat standby channel 55HS or heartbeat request active channel 55HRA includes a marker, i.e., the peak signal, located at a predetermined position within a time slot. The strongest pilot path for the channel and 2 samples on either side of the main path, i.e., 1 and ¼ chips, is statistically analyzed to determine the centroid or peak of a marker within a time slot. The centroid of the samples in FIG. 6 are calculated based on the following equation:

$$L = \frac{\sum [t \times Q(t)]}{\sum Q(t)}$$

where L is a position of the centroid in a time slot, t is the sample time along the X-axis, and Q(t) is the magnitude of a sample at a given sample time. For example, L is calculated based on the results as shown in FIG. 6:

$$L = \frac{(.25*76) + (.5*77) + (1.0*78) + (.8*79) + (.6*80)}{.25 + .5 + 1.0 + .8 + .6}$$

$$L = 78.317$$

Again, the timing alignment error is determined by comparing the timing of the computed centroid to the desired time set point of 80, which is chosen as the reference point for timing alignment within a time slot 310. Since the centroid in the example above is estimated to be 78.317, timing is early and, therefore, the corresponding LQM timing bit 311 will be set to a logic "one" indicating that the corresponding field unit should advance its timing reference by ⅛ of a chip so that subsequent messages are transmitted ⅛ of a chip later in time slot 310. This overall feedback technique in the present invention ensures continuous fine-tuning the time alignment between base unit 25 and each of multiple field units 42.

Preferably, the time error is calculated by taking the integer of twice the difference between the desired set point sample 80 and L. For example, time_error=integer[(L−80)*2]

If the time_error result is negative, the LQM timing bit 311 is set to a logic "one." Conversely, the LQM timing bit 311 is set to a logic "zero" when time_error is positive.

Referring again to FIG. 5, processor 426 analyzes timing data and generates time_error for synchronizing the reverse link heartbeat channels 55H and forward link LQM channel 60L. LQM time slotted messages are then transmitted by LQM signal generator 450 on LQM channel #1 60L to provide timing adjustments for the corresponding field unit 42A as mentioned.

If a field unit 42A in the standby mode transmits a request to go active by transmitting in an assigned time slot of the heartbeat request active channel 55HRA, such a request is detected at heartbeat request active correlation filter 445. As previously discussed, the timing characteristics of an active mode request detected at heartbeat request active correlation filter 445 is also analyzed to determine timing errors as described above for maintaining alignment on a particular link between the base station 25 and each field unit 42A.

If resources are available for allocating traffic channels 55T, the requesting field unit 42A is placed in the active mode by base station 25, where configuration details for setting up the data transfer are handled by processor 426. For example, information regarding new LQM time slot assignments, i.e., assignment of an active mode time slot $A_1 \ldots A_{16}$, is sent to a corresponding field unit 42A over, for example, the paging channel 60P. Reverse link traffic channels 55T are then allocated for transferring a data payload from field unit 42A to base station 25.

While in the active mode, synchronization of the forward and reverse link is maintained based on messages transmitted over the LQM channel 60L and traffic channels 55T since the heartbeat channel time slot is no longer dedicated on the reverse link 65 for use by the transmitting field unit 42A. More specifically, a timing marker is included in the reverse link traffic channel transmissions so that base station 25 can monitor whether data payload field unit 42A is early or late in its timing.

Messages transmitted by a field unit 42A in the active mode are transmitted to base station 25 over traffic channels 55T and the corresponding traffic channel signal is fed into the traffic channel correlation filter 430 at base station 25 for detection of pilot symbol timing markers. Preferably, a field unit 42A transmits a sequence of 32 pilot symbols in an assigned time slot 310 as a timing marker. The traffic channel 55T is then analyzed by pulse timing analyzer 420 to determine whether such messages are early or late with respect to a desired synchronization of the field unit 42 with base station 25.

The process of analyzing a pulse or marker for estimating the centroid is similar to that described earlier in the specification for messages and corresponding markers such as long PN codes on either heartbeat channel 55HS or 55HRA. However, when field unit 42A is in the active mode, pilot symbols in the traffic channels 55T are used as a timing reference mark rather than long PN codes. Again, see FIG. 7 and related discussion above for details regarding how a timing marker is analyzed to identify whether a field unit 42A should advance or retard its timing.

FIG. 8 is a table illustrating different operational modes according to the principles of the present invention and how synchronization is maintained between a field unit and base station for each of the modes.

Preferably, timing alignment of the base station 25 and field units 42 is based upon the LQM timing bit 311 as transmitted in an assigned active time slot $A_1 \ldots A_{16}$ on the forward link 70. When the receipt of data messages transmitted by the active field unit 42 are received early or late with respect to an assigned time slot, the LQM timing bit 311 is set accordingly to advance or retard timing of future message transmissions on the traffic channels 55T.

Although a single traffic channel correlation filter 430 is shown for detecting a marker in a single traffic channel 55T, multiple traffic channels 55T are optionally analyzed to coordinate timing alignment between the reverse link 65 and forward link 70.

As mentioned, access channel 55A is used by the field units 42 to transmit requests for establishing a synchronization link with the base station 25. Typically, messages on the access channel 55A are transmitted on a random basis. Hence, a message collision may occur if two or more link requesting field units 42 happen to transmit a link request message on the access channel 55A at the same time.

If a collision is detected on the access channel 55A, the collision is made known to the field units 42 based upon a message generated by paging channel signal generator 455 over paging channel 60P. Each field unit 42 will then retransmit their request to establish a synchronization link on the access channel 55A based on a random back off time, making it less likely that a collision will occur on a second or other subsequent attempt.

Access channel 55A, also shown in FIG. 5, is fed into access channel correlation filter 435. Preferably, a field unit 42 transmits a sequence of 32 pilot symbols including information identifying the field unit 42A requesting a synchronization link. A received sequence of pilot symbols is analyzed by pulse timing analyzer 422 to determine initial timing information of the field unit 42A with respect to the base station 25. Since the field units 42 randomly transmit requests on the access channel 55A, it is necessary to determine an initial timing error between the field unit 42 and base station 25 for achieving a coarse synchronization of the forward and reverse link channels.

If it is determined by the base station 25 that a synchronization link will be established between the base station 25 and requesting field unit 42A, an appropriate acknowledgment message is transmitted over the forward paging channel 60P to the base station 25 to the corresponding field unit 42A. Among other information transmitted over the forward paging channel 60P to the field unit 42, a heartbeat time slot assignment, an LQM time slot assignment, and synchronization information such as coarse timing adjustment information is also transmitted to the field unit 42. Thus, a field unit 42A newly assigned to the standby mode can transmit an indication over one of the heartbeat-type channels for maintaining more precise synchronization with base station 25.

As mentioned, coarse timing adjustment information is transmitted on the forward paging channel 60P to roughly synchronize the link requesting field unit 42A with respect to base station 25. Preferably, a 10-bit signed number is transmitted to the field unit 42A indicating an amount to advance or retard its timing with respect to the link request message of the field unit 42 as previously transmitted on the access channel 55A. Each least significant bit (LSB) in the 10-bit signed number is appropriately weighted. For example, an LSB can represent 16 chips. Based on this timing correction information, the corresponding field unit 42A adjusts its coarse timing relative to the base station 25. Thereafter, messages are then transmitted in the appropriate reverse link time slot of the heartbeat channel 55HS, 55HRA or traffic channel 55T. Fine-tuning is thereafter achieved by analyzing transmissions by field unit 42A at base station 25 and providing synchronization information over the LQM channel 60L feedback path.

In addition to transmitting in the appropriate time slot, coarse and fine synchronization with the base station 25 renders it possible for a field unit 42 to receive information in its assigned time slot in the forward link.

FIGS. 5a and 5b are a flow charts providing details of how a wireless communication link is established between field unit 42A and base station 25. There are typically multiple field units 42 requesting communication links in a particular service area, where each mobile or field unit 42A is located at a different distance with respect to base station 25. For example, some field units 42 can be located very close to base station 25 while others are located very far away. Hence, the time it takes for a signal to travel from a particular field unit 42A to base station 25 is different for each field unit 42. Precise timing alignment of a specific field unit 42 and the base station 25 is therefore important to avoid or minimize collisions between field units 42 transmitting in adjacent time slots.

If all field units 42 transmitted in real time without taking into account the distance to base station 25 and corresponding delay, message transmissions in an assigned time slot from a particular field unit would be skewed, i.e., messages at the base station would be received slightly out of an assigned time slot. Therefore, message transmissions from each field unit 42A are precisely adjusted as previously discussed to prevent this skewing phenomenon.

Not only does distance from a field unit 42A to base station 25 effect timing alignment, so does the environment in which a field unit 42A transmits a message. For example, building structures, atmospheric conditions and other geographical terrain will effect the path of a signal transmitted from a field unit 42A to base station 25. Therefore a field unit 42 changing position merely a few feet in several seconds can have a substantial impact on timing of a signal path, thus, effecting timing alignment between a reverse link 65 and forward link 70. Based on the principles of the present invention, the previously described method of continuously adjusting timing transmissions in the shared reverse channel 65 minimizes collisions among multiple field units 42 transmitting to base station 25 in adjacent time slots.

Figure 6A:
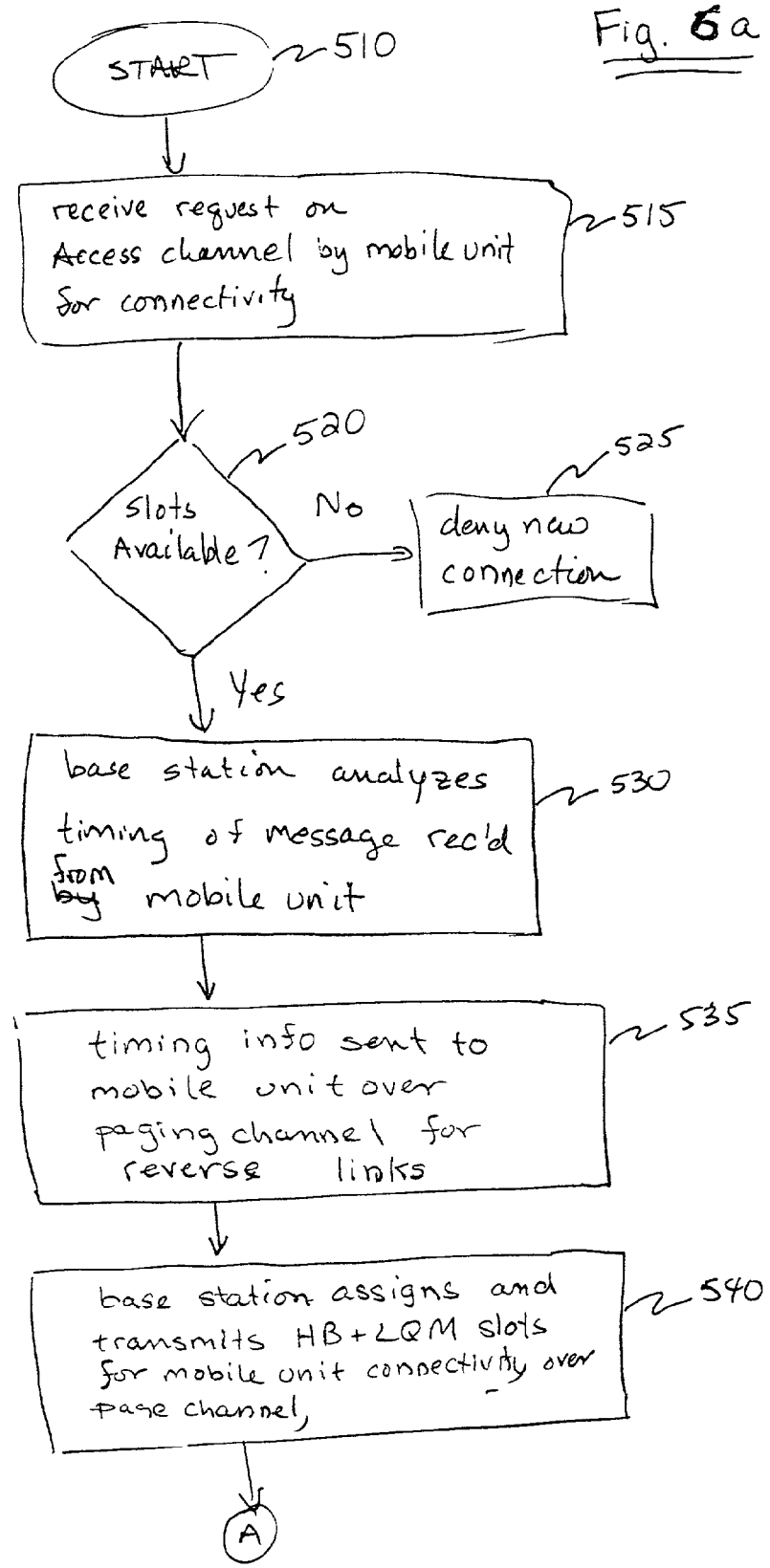
FIGS. 6a and 6b are flow charts illustrating how forward and reverse channels are synchronized according to the principles of the present invention.
Figure 6B:
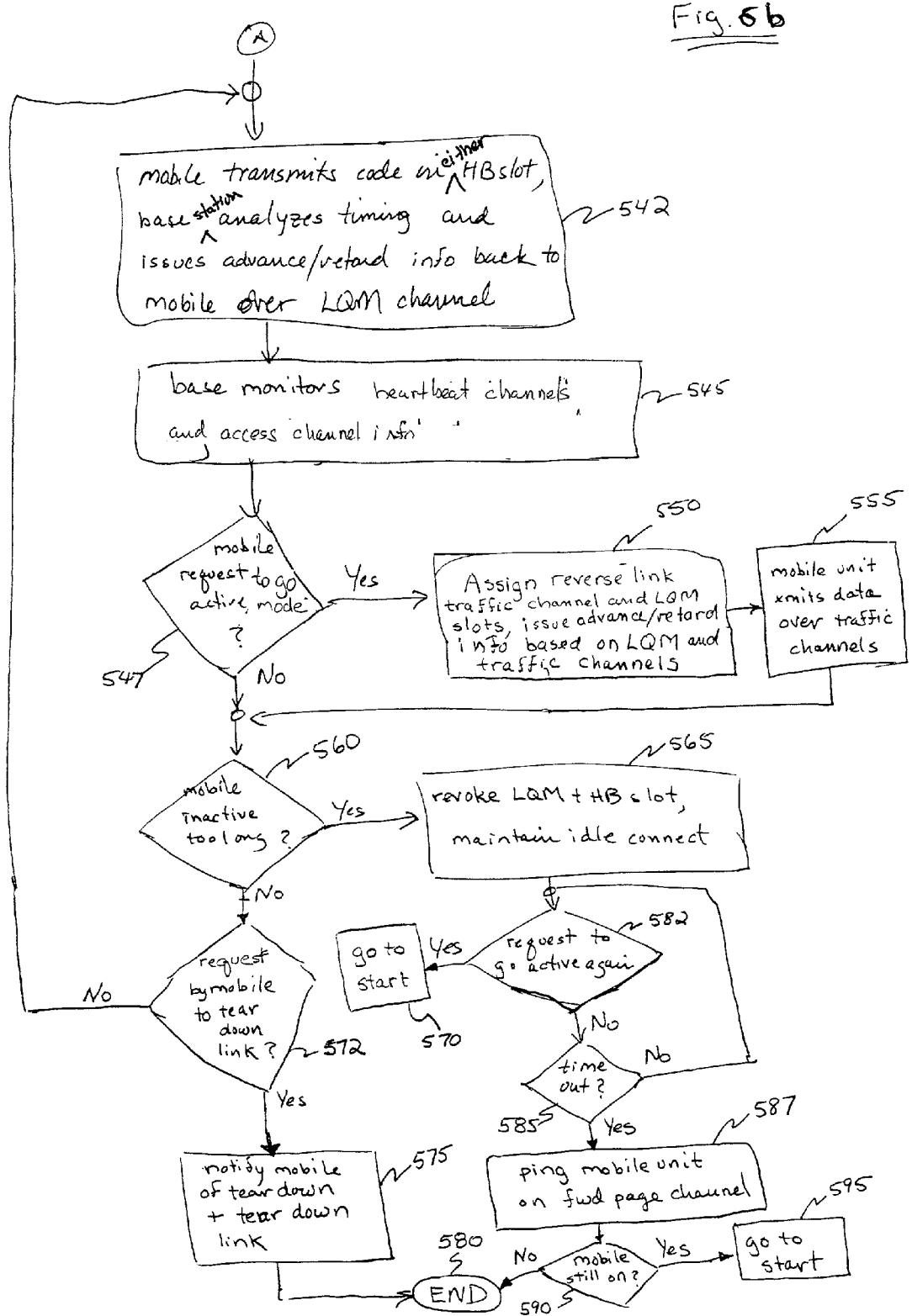

Step 510 in FIG. 6a shows an entry point of the flow chart for establishing a wireless communication link. In step 515, access channel 55A is monitored by base station 25 to detect requests by field units 42 to establish wireless synchronization links with base station 25. A link request message received at base station 25 includes a sequence of pilot symbols followed by data identifying the link requesting field unit 42A. Based on the data information received over access channel 55A, base station 25 is able to access characteristics of the corresponding field unit 42.

If no standby time slots are available for establishing a new synchronization link, the connection request by a field unit 42A is denied as shown in step 525. A message is then transmitted to the corresponding field unit 42A on the forward link paging channel 60P to indicate that no time slots are available and the field unit 42A must try again at a later time to establish a standby synchronization link.

If resources are available to establish a new link in step 520, base station 25 analyzes the timing of the request message as received from a field unit 42A on access channel 55A in step 530. As mentioned, the sequence of 32 pilot symbols are analyzed to determine the location of the peak pulse or marker in the reverse link 65. Based on the time when this random message is received with respect to the base station's master time reference EPOCH mark, M1, and the distance that the field unit 42A is located from base station 25, a coarse time adjustment message is generated by the base station 25 to synchronize timing between the link requesting field unit 42A and base station 25. This coarse timing information, preferably a 10-bit signed number indicating how a field unit 42 should adjust its timing to align the field unit with the base station EPOCH mark, is sent to the field unit 42A over the forward link paging channel 60P in step 535. The field unit 42A then adjusts its timing reference accordingly so that subsequent messages are transmitted in an assigned time slot on the reverse link 65. Timing alignment also ensures that the field unit 42A can receive messages from base station 25 in the appropriate time slot of the forward link LQM channel 60L.

Following in step 540, base station 25 assigns two time slots to the link requesting field unit 42A over paging channel 60P. One time-slot assignment indicates the time slot in which the field unit 42A is to receive LQM messages from the base station 25 over the LQM channel 60L. Another time-slot assignment indicates in which time slot 310 of the reverse link field unit 42 is to transmit over a heartbeat-type channel to base station 25. Based upon these time slot assignments, the base station 25 and field units 42 can determine to which link a message pertains as the time slot itself indicates to which target a message is directed.

While in the standby mode, base station 25 monitors periodic messages in an assigned time slot for a transmission on either the heartbeat standby channel 55HS or heartbeat request active channel 55HRA by a corresponding field unit 42A. For example, a marker received in a time slot of either channel is analyzed at base station 25 to correct timing alignment as mentioned between base station 25 and field unit 42A. If the message in a time slot is received early or late at base station 25, timing of future transmissions by the field unit 42 in an assigned time slot 310 on a reverse link heartbeat channel is appropriately retarded or advanced based upon the LQM timing bit 311 for a particular field unit 42A in step 542.

Timing adjustments are made at the field unit 42A based upon the state of the LQM timing bit 311. Initially, timing is adjusted by ⅛ of a chip in the appropriate direction depending on the state of this bit. However, if the field unit 42A receives 8 retard bits in a row or 8 advance bits in a row over as many EPOCHs, timing adjustments of the reference at the field unit 42A at are based on ½ of a chip instead of ⅛ of a chip for the following LQM bits 311 of the same state. In this way, synchronization between the base station 25 and field unit 42 is achieved more quickly when timing for a link is grossly out of adjustment.

Once the field unit 42A determines that timing is overcorrected, i.e., the polarity of the LQM timing bit 311 changes state from one epoch to the next, timing adjustments at the field unit 42 revert back to ⅛ of a chip for each subsequently received LQM timing bit 311. When synchronization is achieved between a field unit 42 and base station 25, the LQM timing bit 311 will typically be set to alternating logic ones and zeros for several successive EPOCH cycles. In other words, timing at the field unit will jitter ⅛ of a chip when synchronization is practically achieved between the base station 25 and field unit 42A. This amount of jitter is tolerable for maintaining such synchronization links.

If field unit 42A receives another 8 cycles of timing adjustment corrections in the same direction such that 16 successive LQM bits 311 are the same state, the time adjust correction is set to 1 chip per received LQM timing bit 311. As stated earlier, when over-correction is detected, timing adjustments at the field unit are again based on ⅛ of a chip for each received LQM timing bit 311 again.

In addition to monitoring timing pulses for aligning message transmissions of each field unit 42, base station 25 also determines on which heartbeat channel a field unit 42A transmits during its assigned time segment $T_{SLOT}$. It is then determined in step 547 whether a field unit 42A requests to be set to the active mode based on whether the field unit 42A transmits over the heartbeat request active channel 55HRA. If so, the base station allocates appropriate resources such as traffic channels 55T in the reverse link 65 to support the data transfer in step 550. Additionally, base station 25 is assigned an active time slot for use by a field unit 42, i.e., one available time slot between $A_1$–$A_{16}$, in the forward link LQM channel 60L to maintain a synchronization loop. While in the active mode, as mentioned, the field unit 42A maintains synchronization with base station 25 based on a sequence of well-placed pilot symbol markers in the traffic channels 55T, upon which the base station 25 issues timing adjustments in the appropriate time slot 310 using the forward link LQM timing bit 311. Additionally, the field unit 42A transmits data over the reverse link traffic channels 55T in step 555 before returning to the main loop again at step 560. At this re-entry point into the main loop again, the field unit 42 is then reassigned a standby mode time slot 310.

If a field unit 42A has not been in the standby mode too long in step 560, base station 25 determines whether the field unit 42A has made a request to terminate a wireless link between base station 25 and corresponding field unit 42A in step 572. Without the request to tear down a link, processing loops back to step 542.

If field unit 42 generates a request to tear down a corresponding link in step 572, base station 25 acknowledges such a request in step 575 by sending a message to the field unit 42 and tears down the communication link. This is one way of terminating the flow chart as shown in step 580.

Referring again to step 560, if it is determined that the field unit 42A is inactive too long, i.e., in standby mode not transmitting data, the base station revokes the assigned LQM and heartbeat channel slots for use by other users and maintains an idle connection with the field unit 42A in step 565.

When it is determined that field unit 42A requests to go active again in step 582, process flow continues at the beginning of the flow chart to reestablish a synchronized link in step 570. In such a case, connectivity is reestablished based in part on the prior connection. For example, it is not necessary to go through the entire configuration process since data maintained with respect to the corresponding recently active link is advantageously used to minimize the overhead associated with reviving the previous connection.

Flow continues at step 585 if base station 25 fails to detect a request by the field unit 42 to go active again in step 582. If base station 25 fails to receive a response from an idle field unit 42A in a specified time out period in step 585, base station 25 pings the field unit 42 on forward page channel 60P to elicit a response by the field unit 42 in step 587. If the field unit 42A does not respond in step 590, it is assumed that the field unit 42A is shut down and an idle connection is therefore no longer maintained for that particular field unit 42. If the field unit 42A responds to the ping in step 590, process flow continues in step 595 at START (step 510) of the flowchart to reestablish the link as a standby connection.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for supporting wireless communications between a transmitter and a receiver, the method comprising the steps of:
    allocating both a first coded channel and a second coded channel in a common direction to support synchronized communications from the transmitter to the receiver;
    assigning a time segment in which the transmitter communicates an indication to the receiver by generating a reference signal over a selected one of the first coded channel or the second coded channel;
    maintaining transmissions on the first coded channel and the second coded channel in a time segment by analyzing the reference signal on the first coded channel or the second coded channel at the receiver; and
    adjusting timing of the transmitter by sending a message from the receiver to the transmitter indicating whether to advance or retard timing so that subsequently generated reference signals on the first coded channel or the second coded channel fall within a corresponding time segment,
    wherein the message indicating whether to advance or retard timing at the transmitter includes a single bit indicating whether to advance or retard timing, the timing is advanced or retarded a predefined time depending on a logic level of the single bit and
    the timing is advanced or retarded based on a second predefined time if the single bit is in a same state for a predetermined number of periods in a row, the second predefined time being greater than the first predefined time.

2. A method for supporting wireless communications, the method comprising the steps of:
    allocating a coded channel to support synchronized communications from each of multiple transmitters to a receiver;
    assigning a first portion of the coded channel for use by a first transmitter to transmit a reference signal to the receiver; and
    assigning a second portion of the channel for use by a second transmitter to transmit a message to the receiver, the first portion and the second portion of the coded channel transmitting different types of information between the multiple transmitters and the receiver.

3. A method as in claim 2, wherein the reference signal transmitted over the coded channel is a timing signal used to synchronize the first transmitter with the receiver.

4. A method as in claim 2, wherein the signal transmitted by the first transmitter does not include forward error correction information.

5. A method as in claim 2, wherein the reference signal transmitted over the first portion of the coded channel does not include a data payload.

6. A method as in claim 2, wherein the reference signal is analyzed at the receiver and a feedback message is sent to the transmitter for adjusting its timing.

7. A method as in claim 2, wherein the feedback message indicates to the first transmitter whether to advance or retard its timing.

8. A method as in claim 2, wherein the coded channel is divided into time slots.

9. A method as in claim 2, wherein the second transmitter generates a message including forward error correction information.

10. A method for supporting wireless communications between a transmitter and a receiver, the method comprising the steps of:
    allocating both a first coded channel and a second coded channel in a common direction to support synchronized communications from the transmitter to the receiver;
    assigning a time segment in which the transmitter communicates an indication to the receiver by generating a signal at an adjusted power level over a selected one of the first coded channel or the second coded channel;

maintaining transmissions on the first coded channel and the second coded channel in a time segment by analyzing a power level of a transmission on the first coded channel or the second coded channel; and adjusting a power transmission level of the transmitter by sending a message from the receiver to the transmitter indicating whether to increase or decrease its power level so that subsequently generated signals on the first coded channel or the second coded channel can be detected at the receiver, wherein the message indicating whether to increase or decrease power level transmissions at the transmitter includes a single bit indicating whether to increase or decrease its power level of the signal transmitted over the first coded channel or the second coded channel, the timing is increased or decreased a predefined amount depending on a logic level of the single bit and the power level of the signal is increased or decreased based on a second predefined amount if the single bit is in a same state for a predetermined number of periods in a row, the second predefined amount being greater than the first predefined amount.

* * * * *

UNITED STATES PATENT AND TRADEMARK OFFICE
CERTIFICATE OF CORRECTION

| | | |
|---|---|---|
| PATENT NO. | : 7,079,523 B2 | |
| APPLICATION NO. | : 09/775305 | |
| DATED | : July 18, 2006 | |
| INVENTOR(S) | : G. Rodney Nelson, Jr. | |

It is certified that error appears in the above-identified patent and that said Letters Patent is hereby corrected as shown below:

The Title Page, showing an illustrative figure, should be deleted and substitute therefor the attached title page.

Delete drawing sheets 1-9 and substitute therefor the drawing sheets, consisting of figs. 1-9 as shown on the attached page.

Signed and Sealed this

Fifth Day of June, 2007

JON W. DUDAS
*Director of the United States Patent and Trademark Office*

United States Patent
Nelson, Jr. et al.

(10) Patent No.: US 7,079,523 B2
(45) Date of Patent: Jul. 18, 2006

(54) MAINTENANCE LINK USING ACTIVE/STANDBY REQUEST CHANNELS

(75) Inventors: G. Rodney Nelson, Jr., Merritt Island, FL (US); John E. Hoffmann, Indialantic, FL (US); Antoine J. Rouphael, Escondido, CA (US); James A. Proctor, Jr., Indialantic, FL (US)

(73) Assignee: IPR Licensing, Inc., Wilmington, DE (US)

(*) Notice: Subject to any disclaimer, the term of this patent is extended or adjusted under 35 U.S.C. 154(b) by 813 days.

(21) Appl. No.: 09/775,305

(22) Filed: Feb. 1, 2001

(65) Prior Publication Data
US 2002/0080024 A1    Jun. 27, 2002

Related U.S. Application Data

(60) Provisional application No. 60/180,598, filed on Feb. 7, 2000.

(51) Int. Cl.
*H04B 7/216* (2006.01)
*G08C 17/00* (2006.01)

(52) U.S. Cl. .................. 370/342; 370/441

(58) Field of Classification Search .............. 370/320, 370/335, 441, 479
See application file for complete search history.

(56) References Cited

U.S. PATENT DOCUMENTS

| | | | |
|---|---|---|---|
| 4,577,316 A | 3/1986 | Schiff | 370/104 |
| 4,675,863 A | 6/1987 | Paneth et al. | 370/50 |
| 4,817,089 A | 3/1989 | Paneth et al. | 370/95 |

(Continued)

FOREIGN PATENT DOCUMENTS

| | | |
|---|---|---|
| EP | 0 773 636 A1 | 5/1997 |

(Continued)

OTHER PUBLICATIONS

Heine, Gunnar, "The Air-Interface of GSM," in *GSM Networks: Protocols, Terminology, and Implementation*, (MA: Artech House, Inc.), pp. 89-103 (1999).

(Continued)

*Primary Examiner*—Huy D. Vu
*Assistant Examiner*—Daniel Ryman
(74) *Attorney, Agent, or Firm*—Hamilton, Brook, Smith & Reynolds, P.C.

(57) ABSTRACT

Multiple field units in a CDMA system are synchronized for communication with a base station using shared forward and reverse link channels. In an illustrative embodiment, each field unit is assigned a time slot in a forward link channel to receive messages from the base station. Likewise, each field unit is assigned a time slot on a common reverse link channel for transmitting messages to the base station. Timing alignment and power level control among each of many field units and the base station is achieved by analyzing messages received at the base station in a corresponding time slot as transmitted by each field unit. Thereafter, a message is transmitted from the base station in a corresponding time slot to a particular field unit for adjusting its timing or power level so that future messages transmitted from the field unit are received in the appropriate time slot at the base station at a desired power level. In this way, minimal resources are deployed to maintain communication and precise synchronization between a base station and each of multiple users, minimizing collisions between field units transmitting in adjacent time slots on the reverse link. This method reduces the frequency a field unit must rely on the use of a slotted aloha random access channel according to IS-95.

10 Claims, 9 Drawing Sheets

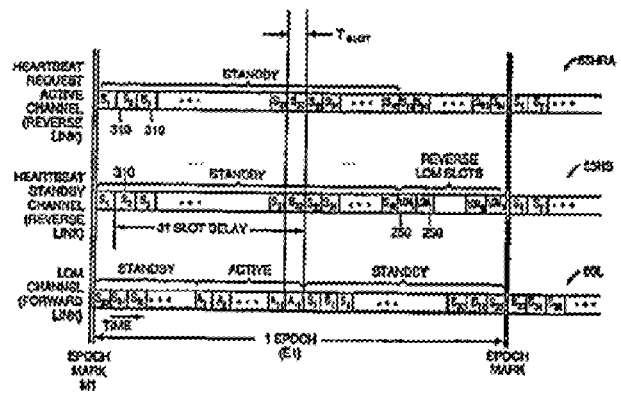

| SUBSCRIBER MODE | SYCHRONIZATION CHANNELS | TIMING REFERENCE IN REVERSE LINK | ASSIGNMNET OF TRAFFIC CHANNELS FOR DATA TRANSMISSIONS |
|---|---|---|---|
| ACTIVE | LQM + TRAFFIC | PILOT SYMBOL SEQUENCE IN TRAFFIC CHANNEL | YES |
| STANDBY | LQM + HEARTBEAT OR LQM + HEARTBEAT - REQUEST | UNIQUE CODE OF HEARTBEAT STANDBY CHANNEL OR UNIQUE CODE OF HEARTBEAT REQUEST ACTIVE CH. | NO |
| IDLE | NONE | NONE | NO |

FIG. 8